(12) United States Patent
L'Allier et al.

(10) Patent No.: US 7,260,355 B2
(45) Date of Patent: *Aug. 21, 2007

(54) AUTOMATED INDIVIDUALIZED LEARNING PROGRAM CREATION SYSTEM AND ASSOCIATED METHODS

(75) Inventors: James J. L'Allier, Batavia, IL (US); Albert Pezzuti, Linthicum, MD (US); Stephen P. Henrie, Tempe, AZ (US)

(73) Assignee: SkillSoft Corporation, Nashua, NH (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/199,987

(22) Filed: Jul. 19, 2002

(65) Prior Publication Data

US 2003/0129575 A1     Jul. 10, 2003

Related U.S. Application Data

(63) Continuation-in-part of application No. 10/001,902, filed on Nov. 2, 2001, now Pat. No. 6,996,366, which is a continuation-in-part of application No. 09/705,153, filed on Nov. 2, 2000, now Pat. No. 6,606,480.

(51) Int. Cl.
*G09B 7/00* (2006.01)
*G09B 19/00* (2006.01)

(52) U.S. Cl. .................................. 434/362; 434/118

(58) Field of Classification Search ............ 434/350, 434/219, 362, 322, 323, 118
See application file for complete search history.

(56) References Cited

U.S. PATENT DOCUMENTS

| | | |
|---|---|---|
| 5,267,865 A | 12/1993 | Lee et al. |
| 5,302,132 A | 4/1994 | Corder |
| 5,416,694 A | 5/1995 | Parrish et al. |
| 5,437,553 A | 8/1995 | Collins et al. |

(Continued)

OTHER PUBLICATIONS

Verl E. Dennis and Dennis Gruner, "Computer Managed Instruction at Arthur Andersen & Company: A Status Report," Educational Technology, Mar. 1992, pp. 7-16.

(Continued)

*Primary Examiner*—Robert Pezzato
*Assistant Examiner*—Robert Mosser
(74) *Attorney, Agent, or Firm*—Peter A. Nieves; Sheehan, Phinney, Bass & Green, P.A.

(57) ABSTRACT

An interactive learning system and method are provided that identify a "gap" between the skill(s) possessed by the individual and those required by an organization and then creates a training regimen to fill that gap. The system and method precisely map the training to the defined required skills by identifying a skill desired to be possessed of a user and accessing a first electronic database that comprises a set of skills currently possessed by the user. Next the desired skill is compared with the possessed set of skills. If the possessed set of skills does not comprise the desired skill, the desired skill is mapped with a training regimen resident in a second electronic database. Then the user is automatically presented with the training regimen. A desired skill level may also be also specified and compared with the skill level currently possessed by the user. If the desired skill level has not yet been achieved, again a mapping is performed and a linked training regimen presented to the user.

4 Claims, 13 Drawing Sheets

U.S. PATENT DOCUMENTS

| | | |
|---|---|---|
| 5,446,891 A | 8/1995 | Kaplan et al. |
| 5,692,906 A | 12/1997 | Corder |
| 5,779,486 A | 7/1998 | Ho et al. |
| 5,810,605 A | 9/1998 | Siefert |
| 5,823,781 A | 10/1998 | Hitchcock et al. |
| 5,823,789 A | 10/1998 | Jay et al. |
| 5,879,165 A * | 3/1999 | Brunkow et al. ............ 434/322 |
| 5,904,485 A | 5/1999 | Siefert |
| 6,039,575 A | 3/2000 | L'Allier et al. |
| 6,091,930 A * | 7/2000 | Mortimer et al. ............ 434/362 |
| 6,126,448 A | 10/2000 | Ho et al. |
| 6,139,330 A | 10/2000 | Ho et al. |
| 6,146,148 A * | 11/2000 | Stuppy ....................... 434/322 |
| 6,149,441 A | 11/2000 | Pellegrino et al. |
| 6,157,808 A | 12/2000 | Hollingsworth |
| 6,162,060 A | 12/2000 | Richard et al. |
| 6,164,975 A | 12/2000 | Weingarden et al. |
| 6,213,780 B1 | 4/2001 | Ho et al. |
| 6,270,351 B1 | 8/2001 | Roper |
| 6,275,812 B1 | 8/2001 | Haq et al. |
| 6,301,462 B1 | 10/2001 | Freeman et al. |
| 6,322,366 B1 | 11/2001 | Bergan et al. |
| 6,334,779 B1 | 1/2002 | Siefert |
| 6,336,813 B1 | 1/2002 | Siefert |
| 6,347,943 B1 | 2/2002 | Fields et al. |
| 6,427,063 B1 | 7/2002 | Cook et al. |
| 6,587,668 B1 * | 7/2003 | Miller et al. ................. 434/350 |
| 6,606,480 B1 | 8/2003 | L'Allier et al. |
| 6,622,003 B1 * | 9/2003 | Denious et al. ............. 434/350 |
| 6,651,071 B1 | 11/2003 | O'Brien et al. |
| 2002/0026452 A1 | 2/2002 | Baumgarten et al. |
| 2002/0064766 A1 | 5/2002 | Cozens et al. |
| 2003/0049593 A1 | 3/2003 | Parmer et al. |
| 2004/0063085 A1 * | 4/2004 | Ivanir et al. ................. 434/322 |

OTHER PUBLICATIONS

James J. L'Allier, Kurt W. Miles, and Sally H. Welsh, "The NETg® Mastery Test Strategy," published as a white paper on the NETg internet web site on Apr. 12, 1995, pp. 1-12.

James J. L'Allier, Kurt W. Miles, "The Skill Builder Philosophy: Learning by Design," (Jan. 9, 1996) Discussion Paper Series.

* cited by examiner

FIG. 3A

DATA COMPRISING TRAINING MAP:

| SKILLS | SKILL LEVEL ACHIEVABLE | COURSE AVAILABLE |
|---|---|---|
| SKILL 1 | 1 | COURSE DA |
| SKILL 1 | 3 | COURSE DB |
| SKILL 2 | 4 | COURSE DC |
| KNOWLEDGE 1 | 1 | COURSE AA |
| KNOWLEDGE 1 | 2 | COURSE FA |
| KNOWLEDGE 1 | 3 | COURSE AB |
| KNOWLEDGE 1 | 4 | COURSE FB |
| KNOWLEDGE 1 | 5 | COURSE AC |
| KNOWLEDGE 2 | 1 | COURSE BA |
| KNOWLEDGE 2 | 3 | COURSE BB |
| KNOWLEDGE 2 | 5 | COURSE BC |
| KNOWLEDGE 3 | 1 | COURSE CA |
| KNOWLEDGE 3 | 4 | COURSE CB |

DATA RESULTING FROM MAPPING TO YIELD RECOMMENDED TRAINING REGIMEN:

| REQUIRED SKILL | RECOMMENDED COURSE |
|---|---|
| SKILL 1 | COURSE DB |
| KNOWLEDGE 1 | COURSE FA |
| SKILL 2 | COURSE DC |
| KNOWLEDGE 1 | COURSE AA |
| KNOWLEDGE 1 | COURSE FB |
| KNOWLEDGE 1 | COURSE AB |
| KNOWLEDGE 1 | COURSE AC |
| KNOWLEDGE 3 | COURSE CB |

AUTOMATED INDIVIDUALIZED LEARNING PROGRAM CREATION SYSTEM AND ASSOCIATED METHODS

CROSS-REFERENCE TO RELATED APPLICATION

This application is a continuation-in-part of application Ser. No. 10/001,902, filed Nov. 2, 2001, for "Automated Individualized Learning Program Creation System and Associated Methods," U.S. Pat. No. 6,996,366, and of application Ser. No. 09/705,153, filed Nov. 2, 2000, for "Automated System and Methods for Creating an Individualized Learning Program," U.S. Pat. No. 6,606,480, which are commonly owned with the present invention and which are incorporated herein by reference.

FIELD OF THE INVENTION

The invention pertains to automated interactive training prescription systems and methods. More particularly, the invention pertains to skills management and learning management systems and methods that perform employee job and/or skills assessments. Most particularly, the invention establishes a system and method for identifying skill gaps in a user and automatically mapping a precise training regimen to the identified skill gaps.

BACKGROUND OF THE INVENTION

Traditionally, organizations have focused their workforce by creating fairly narrowly defined jobs and improving skill-sets of the individuals in those jobs by using periodic training. However, as the workplace environment becomes ever more dynamic, job requirements are becoming increasingly more fluid with corresponding employee skill deficiencies that need to be identified in near real-time. Modern-day organizations require their workforce to have varying levels of knowledge and skills in the same subjects. Organizations are posturing themselves to develop accurate profiles of their employees, knowing what knowledge and skills are present within the organization, the competency levels required for each job, where the deficiencies are, and how to provide timely skills upgrading.

The traditional manual association (i.e., linkage) of knowledge and skill-set requirements to training interventions is a resource-intensive activity that cannot provide timely responses to ever-changing job requirements. Automated tools and procedures are needed to assist organizations in prescribing the exact training interventions that are needed to satisfy employee skill deficiencies. Thus, in order to fulfill these needs, skills management systems and learning management systems must incorporate an automated system and method that can perform the analysis of employee skill deficiencies and provide a precise training regimen that will bring the employee to the desired competency level. This system and method must also be responsive to organizational skill changes/upgrading and the introduction of new/changed training programs.

SUMMARY OF THE INVENTION

It is therefore an object of the present invention to provide a system and method that identify a gap between skills possessed by a user and those desired by an organization for the user to possess.

It is also an object to provide such a system and method that creates a training regimen to fill the identified skill gap.

It is a further object to provide such a system and method for creating an interactive learning environment that is specific to a skill desired to be learned and to a skill level already possessed by the user.

It is another object is to provide such a system and method for maintaining and upgrading the linkages between skilling objects, which comprise integral skills, and training interventions commensurate with an introduction of new skilling objects or training interventions or changes to existing ones.

In accordance with the present invention, an interactive learning system and method are provided that identify a "gap" between the skill(s) possessed by the individual and those required by an organization and then creates a training regimen to fill that gap. The system and method precisely map the training to the defined required skills. In one aspect of the invention, an individualized learning sequence can be developed and presented to the user for the purpose of improving a user's skill and understanding with respect to selected subject matter. While known prior art systems use manual linking of recommended training elements with a desired skill to be learned, the present automatic invention reduces, by at least 95%, the time required to create a link.

The system and method in accordance with the present invention incorporate a computer-based, automatic determination of an individualized learning sequence for a user. The method comprises the steps of identifying a skill desired to be possessed of a user and accessing a first electronic database that comprises a set of skills currently possessed by the user. Next the desired skill is compared with the possessed set of skills. If the possessed set of skills does not comprise the desired skill, the desired skill is mapped with a training regimen resident in a second electronic database. Then the user is automatically presented with the training regimen.

In a preferred embodiment of the method, a desired skill level is also specified and compared with the skill level currently possessed by the user. If the desired skill level has not yet been achieved, again a mapping is performed and a linked training regimen presented to the user.

In an alternate embodiment, if a set of skills and skill levels for the user is not available for accessing, the user instead may be preassessed, with the resultant skill level compared against that desired.

Another aspect of the present invention is a system and method for developing a customizable learning system. The method comprises the steps of constructing a first electronic table comprising a plurality of skills and a second electronic table comprising a list of training regimen identifiers. Then each skill is mapped to at least one training regimen identifier.

A first database is constructed that is adapted to contain a list of users and a set of skills possessed by each user, and a second database is constructed that is adapted to contain a training regimen associated with each training regimen identifier. A user interface is created that is adapted to receive a selection of a skill desired to be learned from a user, wherein the skill is an element of the first table.

A means is created for accessing from the second database a training regimen that corresponds to the skill/training regimen identifier mapping and for presenting the user with the accessed training regimen.

In a preferred embodiment, the second database comprises a prestored, machine-readable database having a plurality of questions or exercises directed towards assessing the individual's understanding of a selected learning objective. A plurality of questions are provided for each member of a plurality of different skills.

The system carries out an automatic evaluation of the individual, if desired, by sequentially selecting from the database at least one of the questions or exercises associated with each member of the plurality of skills. The selected question or exercise is displayed for the individual, who in turn enters a response. Each of the responses that is received is evaluated relative to a predetermined standard before the next question is selected.

The system accumulates the responses and the results of the evaluations for subsequent processing.

The system in turn produces from the results of the evaluations a training regimen comprising a sequence of instructional units based on those responses that varied materially from the respective standard that are intended to improve the user's skills on an individualized basis. The sequence of instructional units can then be presented on a display, for example. The individual can then progress through the sequence of units so as to improve selected skills in response to the prior evaluation.

In one aspect of the invention, subsequent to complete execution of the training regimen, the user can then go through a postlearning evaluation or test for comparison purposes. If the results of the post-testing indicate that the user has not yet attained the desired skill level, the user is recycled through the system, with a second training regimen automatically produced based upon the postlearning evaluation.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIGS. 3A and 3B illustrate in tabular fashion the data flow for creating a customized individual learning plan.

FIG. 7 is an exemplary screen illustrating the "Matches" tab.

DETAILED DESCRIPTION OF THE PREFERRED EMBODIMENTS

A description of the preferred embodiments of the present invention will now be presented with reference to FIGS. 1-7.

Figure 1A:
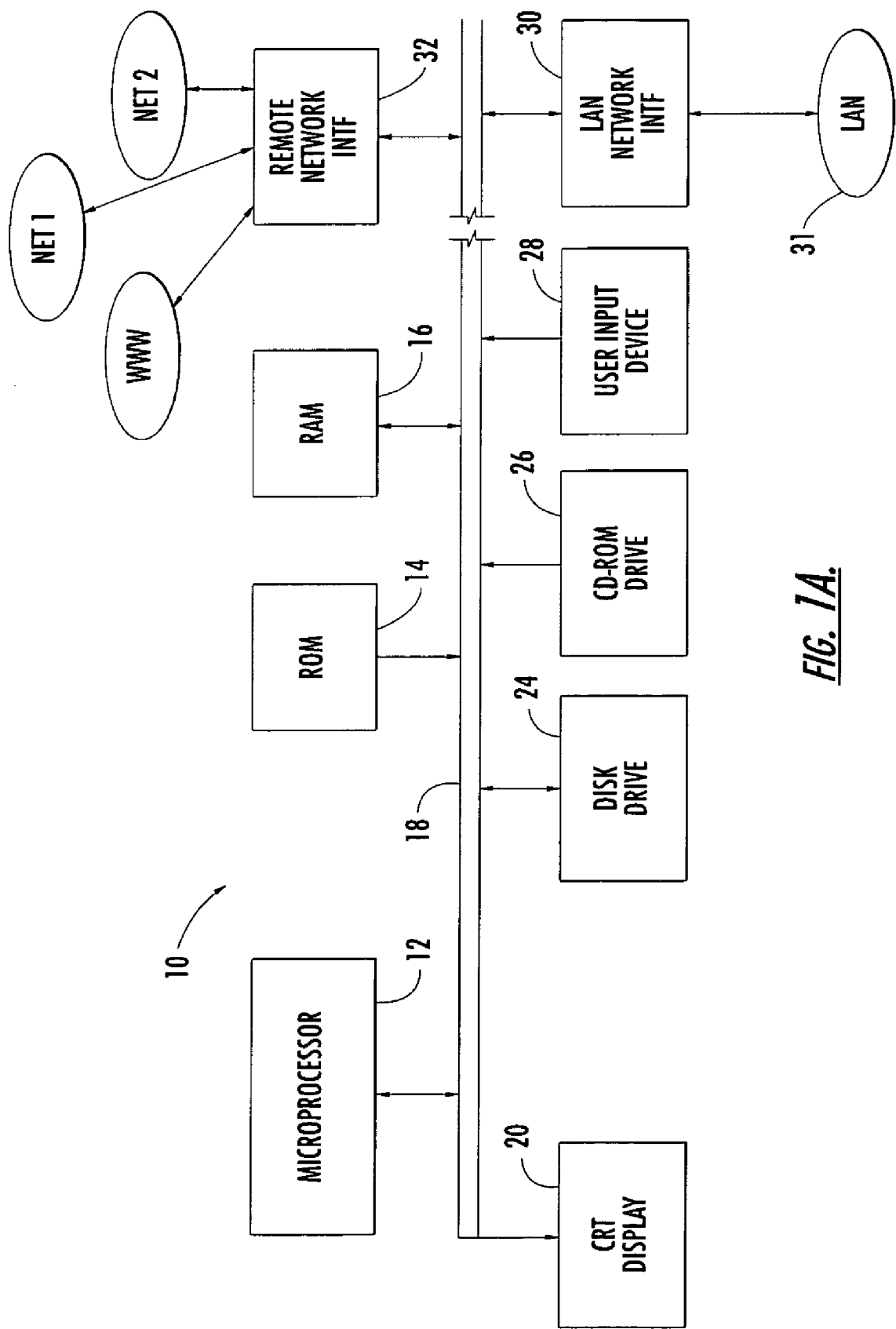
FIG. 1A is a schematic diagram of an exemplary architecture for the system of the present invention.
Figure 1B:
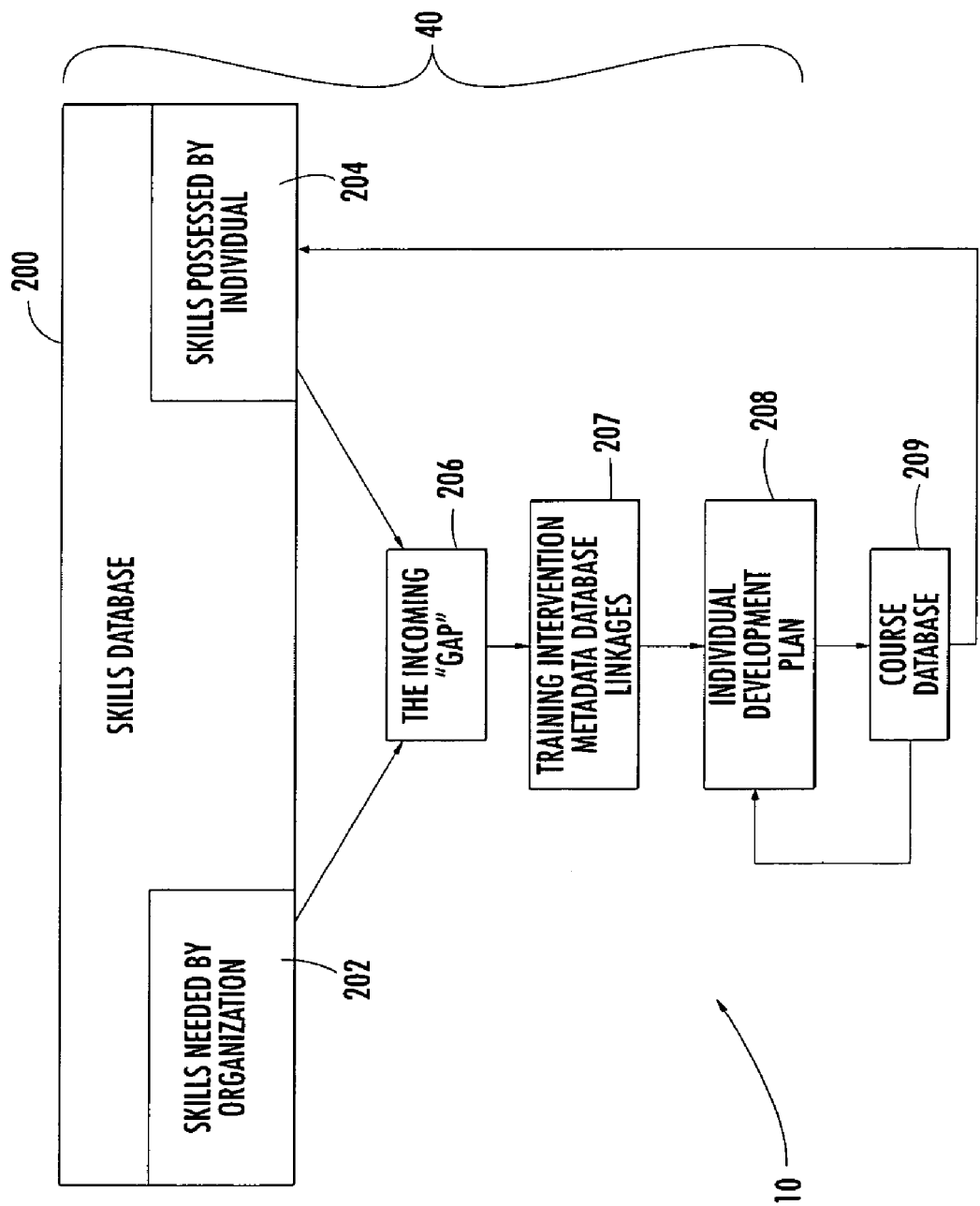
FIG. 1B is a schematic diagram of a typical flow for a user through the functional components of the system of FIG. 1A.
Figure 1C:
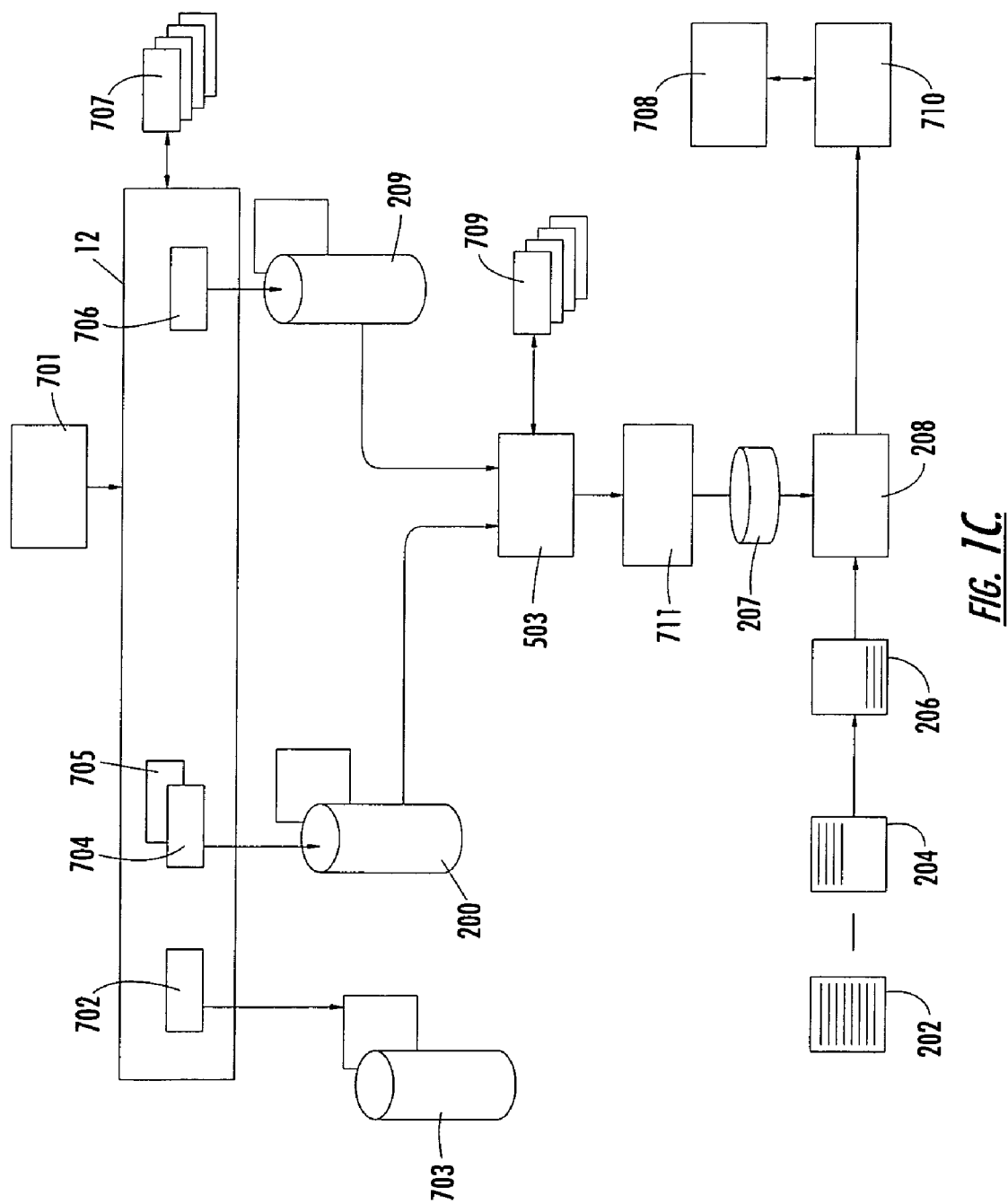
FIG. 1C is a schematic diagram of the functional components of the system of FIG. 1A.
Figure 1D:
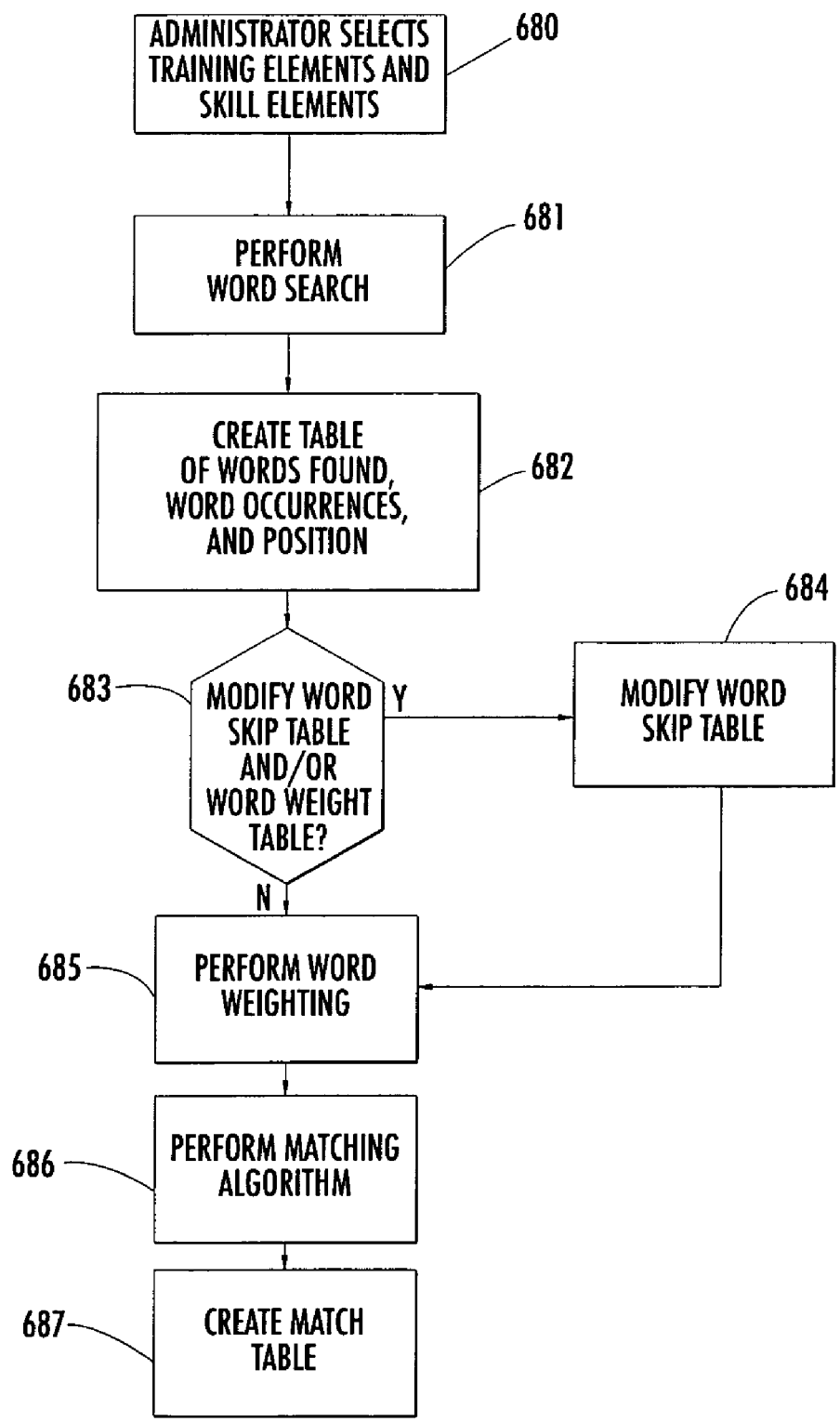
FIG. 1D is a flow diagram of the details of the matching process.
Figure 1E:
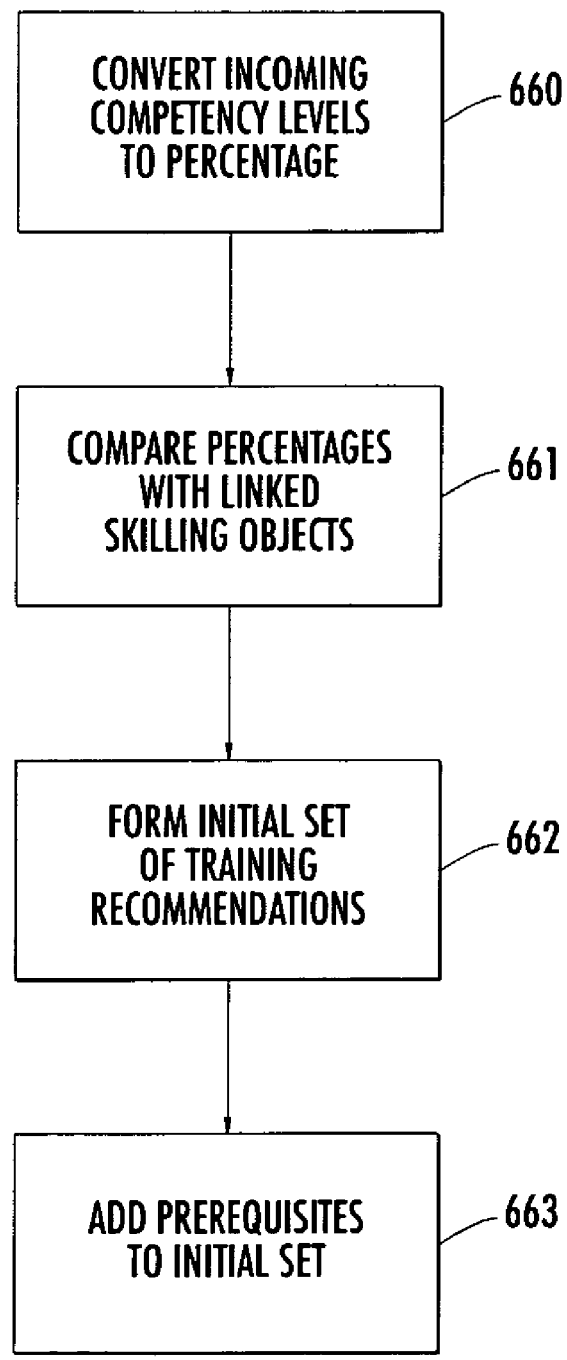
FIG. 1E is a flow diagram of the details of the gap analysis process.
Figure 1F:
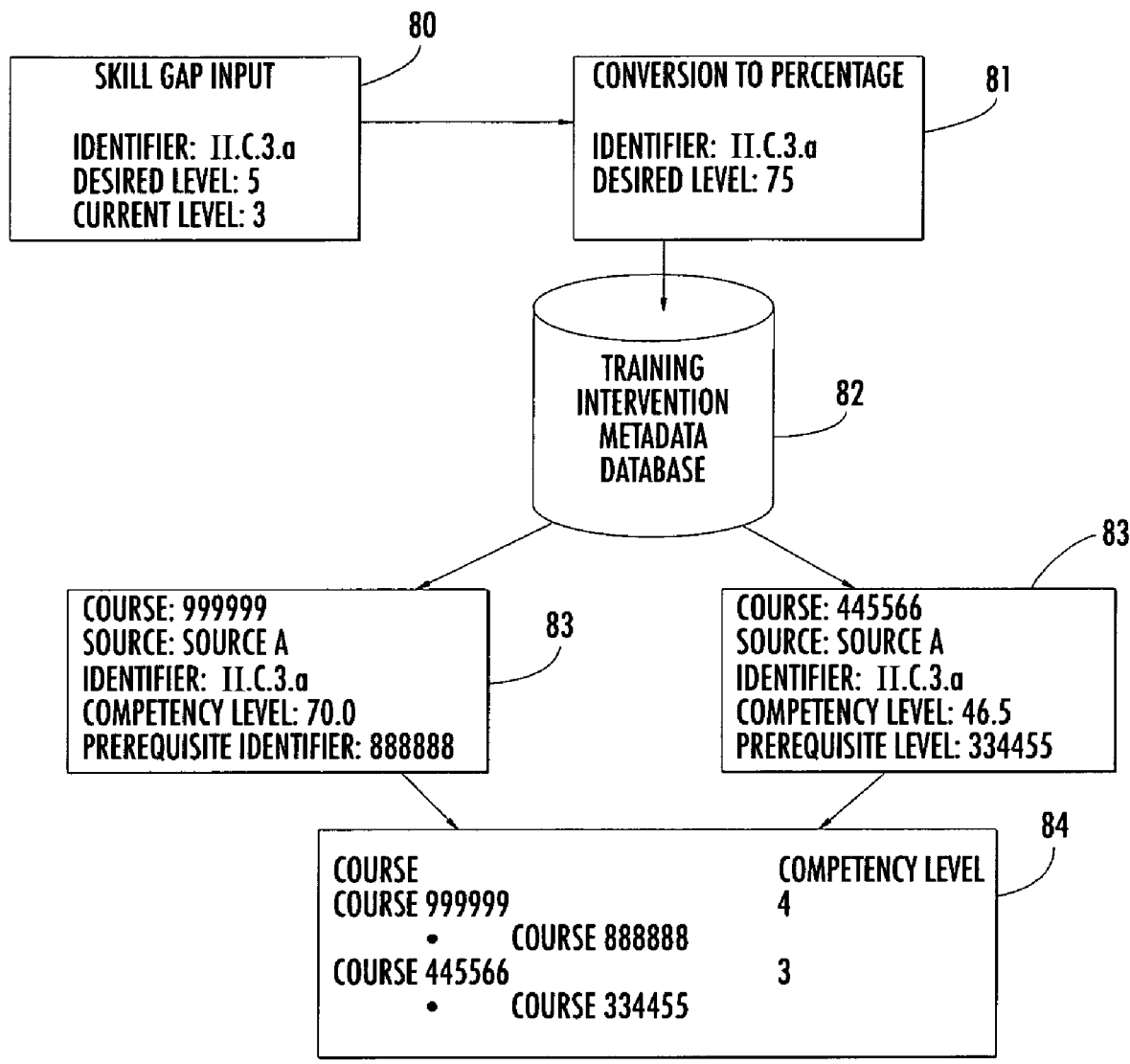
FIG. 1F is a schematic diagram of a typical flow through the gap analysis process and a resultant recommendation.

FIG. 1A is a schematic diagram of the hardware of a preferred embodiment of a system 10 to address the problem solved by the present invention; FIG. 1B is a schematic diagram of a typical flow for a user through the functional components of the system; FIG. 1C is a schematic diagram of the functional components.

The system 10 incorporates a plurality of components (FIGS. 1A and 1C), including a control unit 12, comprising, for example, a microprocessor. Associated with the microprocessor 12 are read-only memory 14 and read-write memory RAM 16, which communicate with the processor 12 via a bidirectional bus structure 18. The memories 14, 16, as is known in the art, can be used to permanently or temporarily store constants, programs being executed, or related data.

Also coupled to the bus 18 is a monitor, such as a CRT-type display 20, disk drive 24, CD-ROM drive 26, and a user input device 28. The user input device 28 may comprise, for example, a keyboard; it could alternately or in addition comprise a pointing device, such as a mouse, or touch screen.

A local area network (LAN) interface 30 enables the system 10 to communicate with the local network 31 (e.g., intranet). Further, a remote network interface 32 provides bidirectional communication with the World Wide Web or other remote networks (e.g., Internet), either through telecommunications or through other forms of data transmission without limitation.

In normal operation, software programs can be stored on and read from disk drive 24 or CD-ROM drive 26. Information can also be read from the CD-ROM drive 26. Both the disk drive 24 and the CD-ROM drive 26 can be used as sources from which databases can be accessed; alternatively, databases may be accessed via the LAN interface 30 or the remote network interface 32.

During normal operation of the system 10 visual information can be displayed on the display unit 20, whether being used by a user, system administrator, or management personnel, under control of the processor 12. Information can be read from disk drive 24 or CD-ROM drive 26 for the purpose of displaying same to the user/administrator/manager. A control program, or a suite of such programs, for the purpose of carrying out the processes of the present invention can be stored on one or both of disk drive 24 or CD-ROM 26 for access by processor 12. Processor 12 is thus able to carry out any of a number of prestored processes that provide for the multiplicity of functions to be described herein.

An overall interactive schematic of one aspect of the invention, which comprises a computer-based method of automatically determining and providing an individualized learning sequence, is illustrated in FIG. 1B. In this embodiment of the method, an organization has identified a skill area in which it desires for a known individual to gain proficiency, and learning tools are available for addressing this need.

In the system 10, the skills are assembled in a skills database 200. When an individual is needed to perform what may be a new skill or an existing skill at a higher skill level, an analysis of the skill possessed already by the individual 204 is performed to determine whether a "gap" 206 exists between the skill 204 and that needed by the organization 202. Preferably this analysis is performed electronically, with the use of gap generator software. The system 10, through the use of gap analysis software of the present invention, creates a complete set of training recommendations to satisfy the gap. An individual development plan 208 for the given skill comprises these training recommendations.

The system's 10 gap analysis software (FIGS. 1E and 1F) converts the two incoming competency levels 80, the user's current level and the desired level to be attained, to a decimal equivalent (percent) 81 (block 660). This normalizes the values so that proper comparison may be made between different competency rating scales. These percentages are then compared with all training interventions linked to the desired skilling object (block 661) in the training intervention metadata database 82. Linked training interventions whose competency levels are within the range set by the incoming levels (i.e., ≦the desired level and ≧current level) are identified as the initial set of training recommendations 83 (block 662).

A "complete" set of training recommendations 84 is accomplished by examining the prerequisite training intervention metadata element of each of the initial set of training recommendations. Prerequisites 85 are added to the initial set of training recommendations (block 663), and are indented or highlighted to indicate that they are "prerequisites" and not the primary training recommendations required to fill a skill gap.

The information contained in each training recommendation comprises the training intervention ID and the competency level and the prerequisite training intervention IDs.

If a gap 206 exists, data representative of the linkage between the required skill and skill level (i.e., competency level) to the appropriate set of training interventions in the training intervention metadata database 207 are used to create an "individual development plan" (IDP) 208. When desired, the course(s) to be taken from the regimen may be accessed from the course database 209.

Typically, not only a particular skill will be required, but also a predetermined level of skill. To this end the skills database 200 will also comprise the individual's skill level for each skill. In this case, the "gap" 206 further comprises a difference in skill level between that which the individual possesses in that skill and that desired by the organization.

Figure 2:
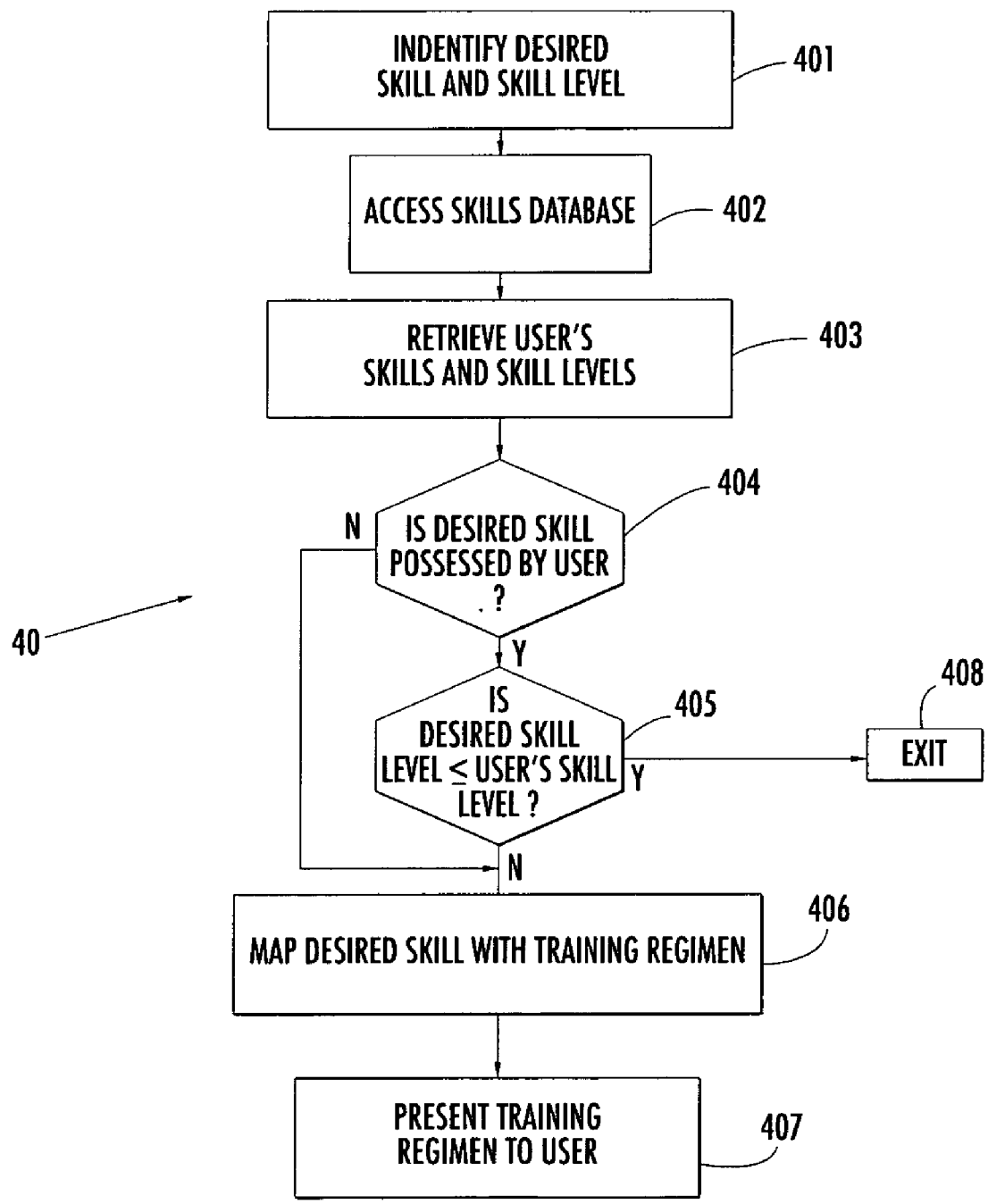
FIG. 2 is a flow diagram of the method for creating an individual development plan.

FIG. 2 is a flow diagram of the method 40 for creating an individual development plan. In this aspect of the method the organization, typically by way of a supervisor or manager, identifies a skill and skill level desired to be possessed by the user 401. The system 10 then accesses the skills database 402 and retrieves the user's skills and skill levels 403. If the desired skill is not already possessed by user 404, the desired skill is mapped with the appropriate training regimen 406. If the desired skill is already possessed by the user 404, the system then checks whether the desired skill level is less than or equal to the user's skill level 405. If so, the system exits 408. If the desired skill level is greater than that possessed by the user 405, the desired skill is mapped with the appropriate training regimen 406; that is, the skills domain is mapped to the training domain.

In some cases the gap 206 is sufficiently great that a plurality of courses will need to be assigned to the user. For example, if the user has a skill level of "1" for a particular skill, and the desired skill level is "5," the user will be assigned a training regimen comprising courses linked to skill levels 1 through 5 of that skill, so that all prerequisites are met en route to achieving the desired skill level.

Once the mapping has occurred 406, the training regimen is presented to the user 407. The types of information that may be obtained by the user is accessed via the metadata resident in a third database 207. The metadata comprise information that describes the attributes of a resource, the training regimen, and here serve as a link between the skills database and the mapping function of the system. Examples of metadata elements include, but are not intended to be limited to, an identifier (ID), a title of the training regimen, a description thereof, objectives therefore, discipline thereof, and prerequisites.

Figure 3A:
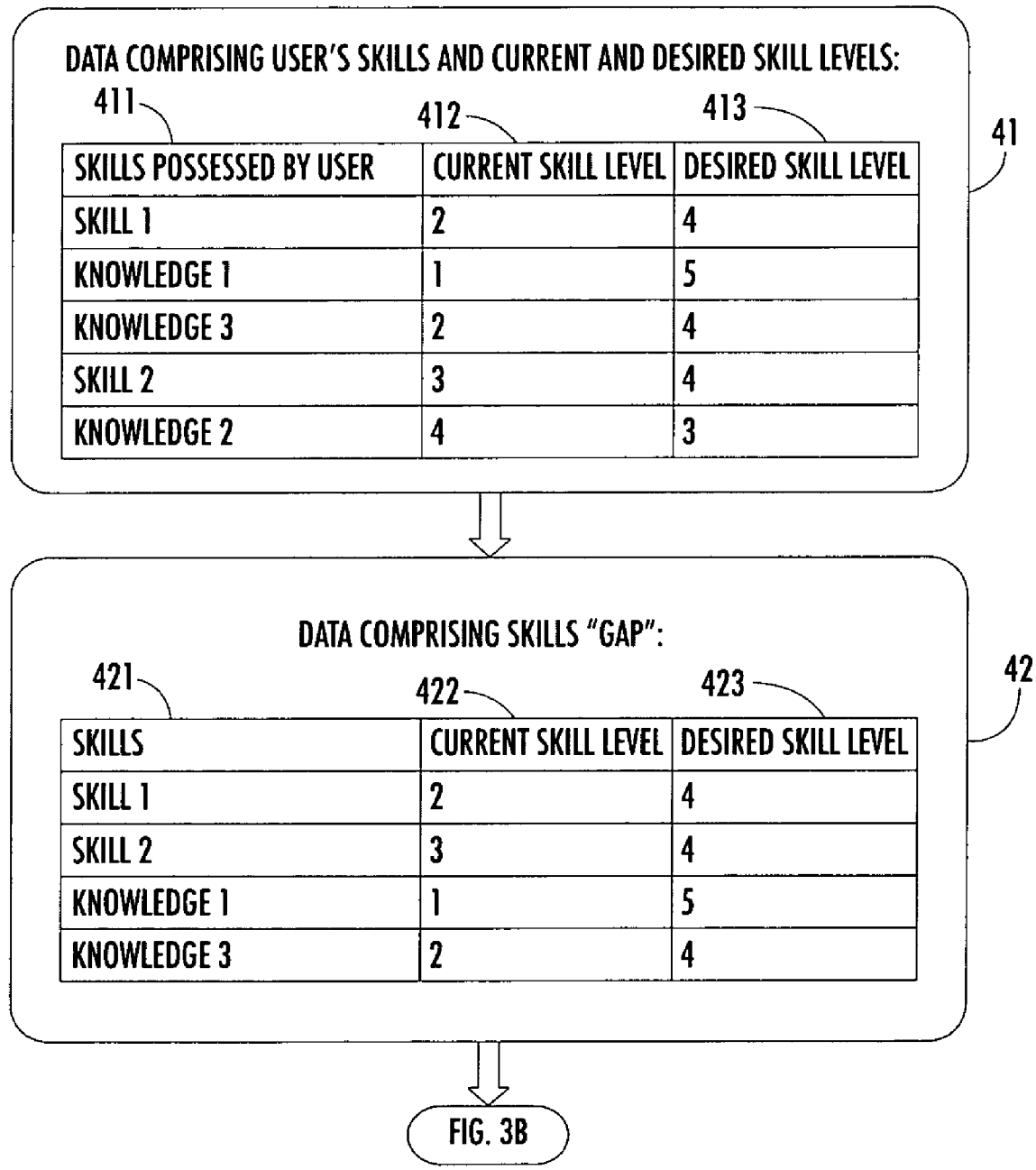

A tabular depiction of the data flow comprising the mapping is given in FIGS. 3A and 3B, wherein a first table 41 contains the user skills and organization requirements from databases 204, 202, including a column of skills 411, the user's current skill level 412, and the organization's desired skill level 413. From these data is generated a second table 42, demonstrating the "skills gap" for each skill, the first column 421 again comprising the skills, the second column 422 the user's current skill level, and the third column 423 the desired skill level. In this table 42, the rows of table 41 have been deleted wherein the user's skill levels matched or exceeded those required.

In a third table 43 a training map is formed, wherein each skill 431 that appears in the second table 42 is located in the metadata database, and mapped to all available courses 433 and their respective skill levels 432. Another important aspect of the invention is that a multiplicity of courses on the same skill having ascending skill levels may be defined hierarchically, so that an entry level is predefined for each course and a series of courses with ascending prerequisite skill levels included in the mapping. For example, in the table 44, five levels of courses, AA, FA, FB, AB, and AC, are recommended to achieve the desired skill level of 5 for Knowledge 1.

It should also be noted that an important aspect of the present invention is that the source of each course 433 is immaterial, as is the skill level range, and that any number of courses, levels, and sources thereof are in principle accessible by the system, so long as the metadata have been entered into the third database so that they may be accessed by the system 10.

Figure 4:
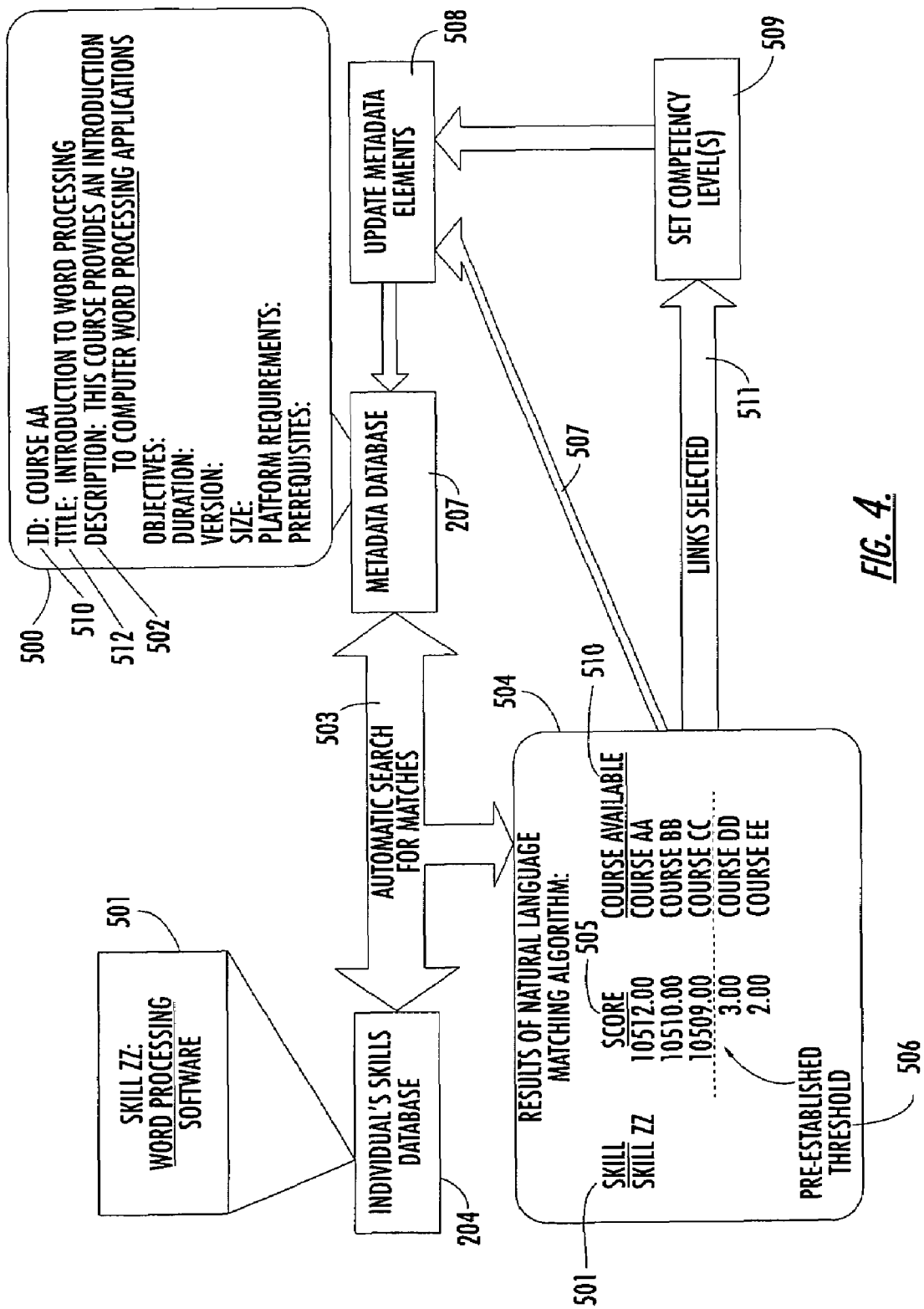
FIG. 4 is a schematic diagram of automatic matching, automatic linkage, and semiautomatic linkage for creating a training regimen.
Figure 5:
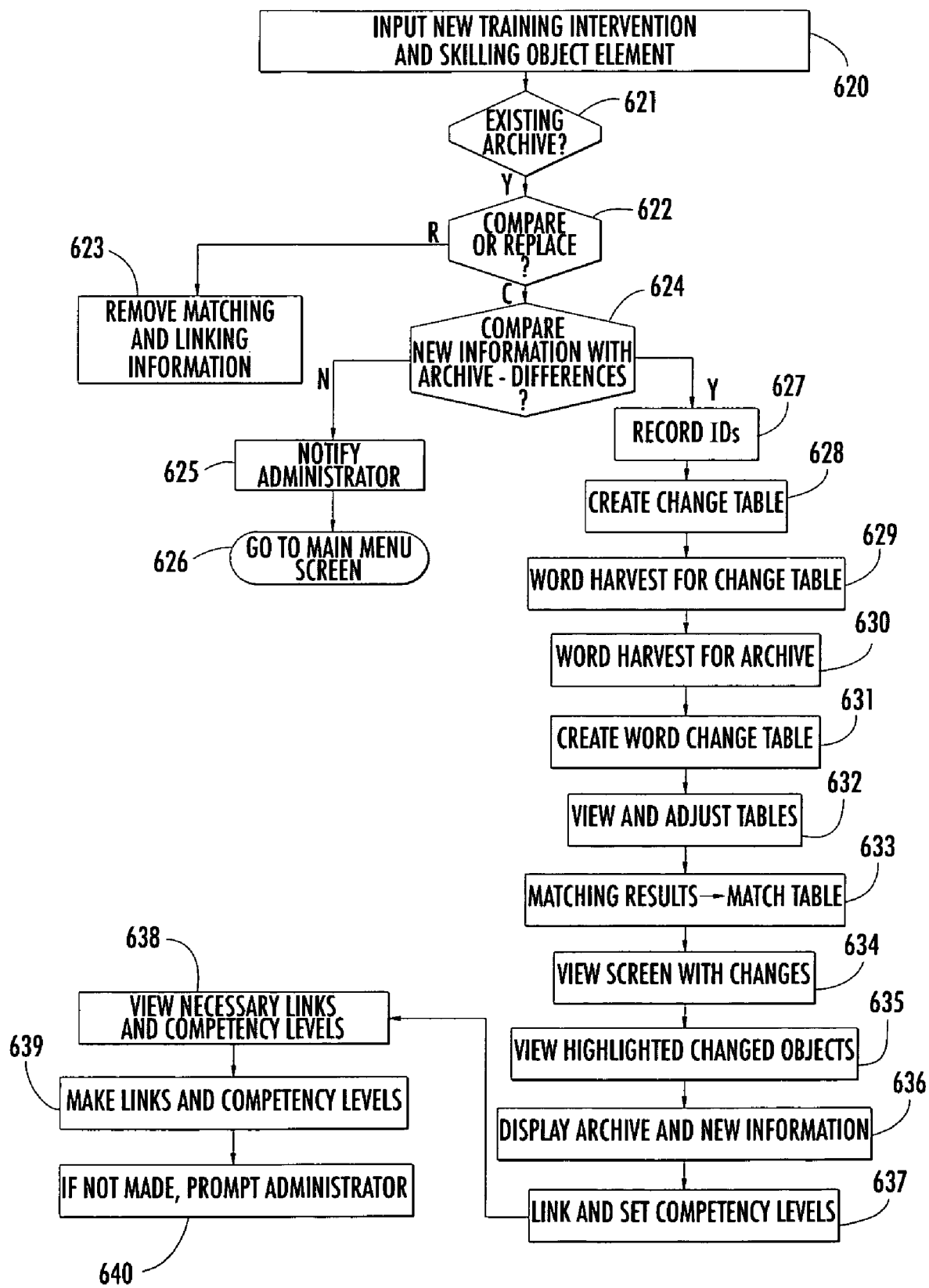
FIG. 5 is a block diagram of the updating process.

As described previously, the metadata included in the metadata database 207 preferably include a "natural language" description 502 of each course, and any other descriptive information about the content of the course, such as learning objectives (FIG. 4). A schematic diagram of automatic matching, automatic linkage, and semiautomatic linkage indicates that, at this point in the process, an ID 501 of a skill in natural language in the individual's skills database 204 is automatically matched with a course description 502, as well as other metadata elements, such as title 512, also in a natural language, which is an element of the metadata set 500 for a course 510 (here Course AA) in the metadata database 207. A matching algorithm 503 resident in a processor provides the exemplary results shown in block 504. An important feature of the present invention is the ability for the administrator to select which training metadata element(s) and skilling object metadata element(s) the matching software examines, from one element to all elements. The matching algorithm 503 establishes probable matches between skills and training elements on the basis of probable relevancy, creating a match table with probability scores that provide a high level of certainty for making links of training elements to skills during the linking process.

To describe the matching process, a natural language matching algorithm, in more detail (FIG. 1D), the administrator performs a "setup" procedure, which comprises selecting metadata elements for the skills such as title description and definition, and selecting metadata elements for the courses, such as course title, course description, objectives, etc. (block 680), that are to be considered. These selected "operating elements" (Table 1), such as title, description, objectives, etc., are taken from a table containing course information (Table 2) and skills (Table 3). The selected operating elements are then fed to the "matching" software, which comprises a "harvest" program and a "weighting" program.

The harvest program searches through all the words in the operating elements (block 681) and establishes a table, Table 4 (block 682), that contains a list of words found in both the skills metadata and the training metadata, and the number of times each word occurred in the skills metadata and training metadata along with the word weight (as per the word weight table). Any words found that are contained in the word skip table are ignored during the running of the harvest program. From the list of words found in each skill, a "dictionary of words" for each skill is established that will be the basis for computing the total "match score" for the skill and any training intervention that has words contained in the skill's dictionary of words.

The harvest program also creates a "phrases" table (Table 5) that contains two-, three-, and four-word phrases or word groupings. These phrases are used during the weighting program to give "bonus" points to the total match score. For example, "software programming" in a training intervention element and a skilling object element would provide additional bonus points in the total match score.

If desired (block 683), the administrator can modify the word skip table and/or the word weight table (block 684) prior to running the harvest program (block 685).

TABLE 1

| SourceTable | SourceKeyCol | SourceValCol |
|---|---|---|
| Courses | CourseID | CourseTitle |
| Courses | CourseID | CourseOverview |
| Courses | CourseID | CourseObjectives |
| Skills | ObjID | Title |

TABLE 2

| Course ID | Course Title | Course Overview | Course Objectives |
|---|---|---|---|
| 12663 | C++ Programming Fundamentals - Part 1 | This is the first course in a two-part course covering the fundamentals of programming with the C++ programming language. This series will show you how to get the benefits of good software engineering and code reuse by using C++ and object-oriented programming techniques in business applications. | Use C++ classes and functions. Use C++ objects, data types, inline functions and referencing. Use composition and association in C++ programs. |

TABLE 3

| ObjID | SkillType | Title |
|---|---|---|
| KNOW1012 | KNOW | Programming Languages: |
| TOOL412 | TOOL | Oracle |
| KNOW581 | KNOW | Television Programming |
| TOOL584 | TOOL | UNIX (Solaris, BSD, etc.) |

TABLE 4

| ID | Word | WordSkillCount | WordCourseCount | Weight |
|---|---|---|---|---|
| 1 | corporate | 7 | 4 | 0.004 |
| 2 | communications | 13 | 7 | 3 |
| 8 | media | 5 | 1 | 3.8 |
| 9 | publishing | 4 | 15 | 2.3 |
| 11 | design | 34 | 55 | 0.0002 |
| 12 | copy | 1 | 1 | 0.55 |
| 13 | writing | 3 | 3 | 2.3 |
| 16 | desktop | 6 | 17 | 3 |
| 17 | tools | 116 | 22 | 0.0002 |
| 19 | web | 4 | 65 | 0.55 |
| 20 | development | 52 | 14 | 0.0002 |
| 22 | software | 195 | 74 | 0.006 |
| 23 | package | 1 | 10 | 0.0002 |
| 24 | customer | 20 | 3 | 3 |
| 25 | support | 43 | 12 | 0.0002 |
| 26 | trends | 19 | 1 | 0.55 |
| 30 | procedures | 25 | 2 | 0.0002 |
| 31 | service | 21 | 2 | 0.55 |
| 34 | architecture | 9 | 6 | 3 |
| 35 | problem | 4 | 17 | 0.57 |
| 36 | management | 53 | 41 | 0.0002 |
| 37 | process | 30 | 9 | 0.55 |

TABLE 5

| Phrase | Obj ID | Course ID | Phrase Skill Count | Phrase Course Count | Total Phrase Points |
|---|---|---|---|---|---|
| accounting principles | TFN410 | 187874884X | 1 | 1 | 500 |
| active directory | Z-ACTD | 0619016914 | 1 | 1 | 500 |
| active directory | Z-ACTD | 0619035587 | 1 | 1 | 500 |
| active directory | Z-ACTD | 0619062819 | 1 | 1 | 500 |
| active server pages | Z-ASP | 061901525X | 1 | 1 | 500 |
| active server pages | Z-ASP | 0619068086 | 1 | 1 | 500 |
| application development | T0230 | 0619022655 | 7 | 1 | 500 |
| application development | T0230 | 061903565X | 7 | 1 | 500 |
| application development | T0230 | 0760035601 | 7 | 1 | 500 |
| application development | T0230 | 1565277325 | 7 | 1 | 500 |
| application development | T0270 | 0619022655 | 1 | 1 | 500 |
| application development | T0270 | 061903565X | 1 | 1 | 500 |
| application development | T0270 | 0760035601 | 1 | 1 | 500 |
| application development | T0270 | 1565277325 | 1 | 1 | 500 |
| application development | T0271 | 0619022655 | 2 | 1 | 500 |
| application development | T0271 | 061903565X | 2 | 1 | 500 |
| application development | T0271 | 0760035601 | 2 | 1 | 500 |
| application development | T0271 | 1565277325 | 2 | 1 | 500 |
| application development | T0272 | 0619022655 | 3 | 1 | 500 |
| application development | T0272 | 061903565X | 3 | 1 | 500 |
| application development | T0272 | 0760035601 | 3 | 1 | 500 |
| application development | T0272 | 1565277325 | 3 | 1 | 500 |
| application development | T0273 | 0619022655 | 4 | 1 | 500 |
| application development | T0273 | 061903565X | 4 | 1 | 500 |
| application development | T0273 | 0760035601 | 4 | 1 | 500 |
| application development | T0273 | 1565277325 | 4 | 1 | 500 |
| application development | T0300 | 0619022655 | 5 | 1 | 500 |
| application development | T0300 | 061903565X | 5 | 1 | 500 |
| application development | T0300 | 0760035601 | 5 | 1 | 500 |
| application development | T0300 | 1565277325 | 5 | 1 | 500 |
| application development | ZZ-T0300 | 0619022655 | 6 | 1 | 500 |
| application development | ZZ-T0300 | 061903565X | 6 | 1 | 500 |
| application development | ZZ-T0300 | 0760035601 | 6 | 1 | 500 |
| application development | ZZ-T0300 | 1565277325 | 6 | 1 | 500 |
| application software | M700 | 0314414460 | 2 | 1 | 500 |

The system of the present invention contains a function that allows the administrator to insert words into a word weight table and assign a weight (normally a value other than the default weight value of "3") to these words. The present invention also allows modification of the weights of words contained in the word weight table or deactivation of the over 37,000 words that are supplied with the present invention. If a word was deactivated in the word weight table, the administrator may choose to place the word in the word skip table, or vice versa. This table, an example of which is found in Table 6, thereby allows the administrator to enhance the probability of valid matches due to known words in the skills' metadata elements that are used by many different training interventions, or to adjust any number of words in the word weight table based on other factors such as unique word use by certain industries or professions. For example, if the word "Microsoft" were used in describing many training interventions, the weight may be reduced to a value less than "3." If, for example, the present invention were being used to link skills to training interventions in the highway construction industry, the administrator could change the words "bridge" and "bridges" from their standard weights of 0.55 to higher values such as 25.0. This form of "tailoring" the word weight table and/or the word skip table allows the present invention to be enhanced for a particular discipline for which the invention is being used. The administrator would complete any desired word weight table adjustments before running the weighting program.

TABLE 6

| ID | Word | Weight |
|---|---|---|
| 14 | crippled | 0.002 |
| 15 | corollary | 0.57 |
| 16 | corollaries | 3.8 |
| 17 | cordless | 0.004 |
| 18 | cleanly | 0.003 |
| 19 | charge | 0.55 |
| 20 | charges | 0.55 |
| 21 | casing | 2.3 |
| 22 | casings | 4.0 |
| 23 | cerulo-plasmin | 25.0 |

Another aspect of the present invention includes an exemplary list of over 37,000 weighted and skip words, and a system and method for creating/expanding the word skip and word weight tables for a given language. The method of assigning weights to words follows a set of guidelines inherent in the present invention that are language independent, allowing the present system to function in all languages (e.g., English, French, German, Spanish, etc.). The guidelines are presented in Table 6A, in U.S. English, along with examples for each type of word that is expected to be encountered. Essentially, words in the word skip table have a point value of zero (0), while words in the word weight table can have various values, depending upon the form (e.g., noun, noun/verb, noun/verb/adjective, etc.) that the word can take in a sentence. For example, the word "project/ projects" can be used in a sentence as either a noun (singular or plural) or verb (present tenses), which would result in setting the weight for both "project" and "projects") as a "noun/verb" weight of "0.55," but the past and past participle, "projected" and "projecting," can only be a "verb" and would not provide contextual meaning to the subject of the sentence, and therefore would be placed in the word skip table. Words that are not placed in one of these tables are assigned a default weight of three (3), as indicated in the "Neither" column in Table 6A.

TABLE 6A

| | | It goes in: | | |
|---|---|---|---|---|
| If the word can be a: | For example | WorkSkip Table | WordWeight Table with a point value as stated | Neither |
| 1. Pronoun Only | He, she, it, they, I | X | | |
| 2. Preposition Only | For, at, | X | | |
| 3. Conjunction Only | And, but, for, nor | X | | |
| 4. Interjection Only | Yikes | X | | |
| 5. Determiner Only | The, an, a | X | | |
| 6. Verb ONLY that are general and can apply to more than one subject | Perform, tell, organize | X Note: For those instances where the present participles are nouns e.g., burnishing), the word will follow guideline #22. | | |
| 7. Verb ONLY whose use is normally restricted to a single subject NOTE: Use carefully. Normally, follow the #6 guideline; Verb ONLY above | Coagulate | | X (All forms) Point Value = 5.0 | |
| 8. Verb and Adjective | Approximate | X [Present tenses ("s "or" es"), past and past participle ("ed"), present participle ("ing")] | X (Verb form and adjective) Point Value = .002 | |
| 9. Verb, Adjective, and Adverb | Direct | X a. [Present tenses ("s" or "es"), past and past participle ("ed"), present participle ("ing")] b. [Adverb] | X (Verb form, adjective, and adverb) Point Value = .001 | |
| 10. Verb and Noun | Strike, plan, punt, reserve, program, quarter | X [Past and past participle ("ed"), present participle ("ing")] Note: For those instances where the present participles are nouns (e.g., accounting), or adjectives/nouns (e.g., acting) the word will follow guideline #22. | X (Singular and plural forms of the noun) Point Value = .55 | |
| 11. Verb, Noun, and Adjective | Smash, plane, aggregate, associate | X [Past and past participle ("ed"), present participle ("ing")] Note: For those instances where the present participles are nouns (e.g., accounting), or adjectives/nouns | X Singular and plural forms of the noun Point Value = .54 | |

TABLE 6A-continued

| | | It goes in: | | |
|---|---|---|---|---|
| If the word can be a: | For example | WorkSkip Table | WordWeight Table with a point value as stated | Neither |
| 12. Verb, Noun, Adjective and Adverb | Back | X [Past and past participle ("ed"), present participle ("ing")] | X Singular and plural forms of the noun Point Value = .53 | |
| 13. Verb, Noun, and Adverb | Bang | X [Past and past participle ("ed"), present participle ("ing")] | X Singular and plural forms of the noun Point Value = .52 | |
| 14. Noun that has more than one definition and is not extremely general (see guideline #23) or unique (see guideline #15). Note: Included in these are the ". . . ness" nouns (e.g., accurateness) usually formed by adding "ness" to adjectives. | Administration, attention | | | X (Singular and plural forms of the noun) |
| 15. Noun/Adjective that has ONLY one definition and is unique to a particular discipline or subject. If the word is used often in the training interventions, such as 'computer', it should not be given this weight. Instead, it should be given a weight of '3' (the default weight). | Pneumonia, hygrophytic, hygroscope, spacecraft | | X (Singular and plural forms of the noun) Point Value = 25.0 | |
| 16. Noun and Adjective | Moderate, resident | | X Singular form of the noun and adjective Point Value = .57 Plural form of the noun Point Value = 3.8 | |
| 17. Noun, Adjective, and Adverb | Andante, bimonthly | | X Singular form of the noun, adjective, and adverb Point Value = .56 Plural form of the noun Point Value = 3.6 | |
| 18. Adjective Only NOTE: See guideline #15 for unique adjectives.. | | | X Point Value = .004 | |
| 19. Adverb Only | | X | | |
| 20. Adjective and Adverb | | | X Point Value = .003 | |
| 21. Noun and Adverb | Tomorrow, sidesaddle | | X Singular form of the noun and adjective Point Value = .51 Plural form of the noun Point Value = 3.4 | |

TABLE 6A-continued

| If the word can be a: | For example | WorkSkip Table | WordWeight Table with a point value as stated | Neither |
|---|---|---|---|---|
| 22. "ing" forms of a verb used as a noun. Note: If the 'ing' noun is very general (e.g., planning), use a point value of 0.501. Also, the use of the 0.501 value is used for 'ing' verbs that are not classified as nouns in the dictionary but sometimes intended to be nouns or adjectives by authors of skill or training intervention titles (e.g., delegating). | Accounting, beating, flying, sailing | | X<br>Singular form of the noun<br>Point Value = 2.3<br>Plural form of the noun<br>Point Value = 4.0 | |
| 23. Nouns that are extremely general. This includes nouns that are also adverbs, verbs, and adjectives, | Concept, concepts, item, items, notion, notions, idea, ideas, basics, yes, fundamental, fundamentals | | X<br>Singular and plural forms of the noun<br>Point Value = .0002 | |
| 24. Words that can be both a noun (singular and plural) and verb (present and 3$^{rd}$ person present singular) that deal with a unique discipline or subject. | leister/leisters microwave/ microwaves, lullaby/lullabies | | X<br>Singular and plural forms of the noun<br>Point Value = 20.0 | |
| 25. Very general abbreviations. | i.e., e.g. | | Point Value = 0.0001 | |

Exceptions to these general rules are as follows:

If the word is a proper noun such as, for example, a company name that appears many times in the training intervention metadata elements (e.g., Microsoft, Lotus) in conjunction with a product (e.g., Microsoft Excel) but only a few times in the skilling object metadata elements, then the word should be placed in the word weight table with a point value of "0.006." In cases such as these, the company name is viewed as an "adjective-like word" and, as such, is given a weight of close to the adjective weight (0.004; see Guideline 18) or 0.006. If the word is not a proper noun but is used often in the training intervention metadata, a weight of 0.05 is assigned.

If a word (or words) is used to describe a product/technology or an entity (e.g., Dolby, Visual Basic, Virtual Reality, and pneumonia), then the word (or words) should be placed in the word weight table. When assigning point values, caution should be exercised because common usage of these words will cause a higher than normal match scores for invalid associations between the skilling object and the training intervention. It is preferable that the administrator check the results of such action by running a harvest and then examine the results of such settings on the match scores. It may be necessary for the administrator to examine the words in the skilling objects. Adjustments (e.g., lowering of the point value or moving words between the word skip and word weight tables) may be necessary.

Typically, technical terms such as "Windows," "server," "Basic," or "Notes" that appear often in the training interventions' metadata are placed in the word weight table with a value of 0.50 and their singular/plural forms are assigned a weight according to the guidelines contained herein. Examples include: "Basic"=0.50 and "basics"=0.0002; "Notes"=0.50 and "note"=0.55; "Access"=0.50 and "accesses"=0.0002.

Unique words and abbreviations such as "Dolby," "bioengineering," "tracheotomy," or "pneumonia" would follow the guideline in Row 15 in Table 6A.

It will be understood by one of skill in the art that, although many of the exemplary words in the above examples primarily occur in the software and computer science arts, they are not intended to limit the breadth of the present invention. As previously stated, the present invention contains an exemplary list of over 37,000 words in the word weight and word skip tables that apply to all subject areas/disciplines.

Following the application of the harvest program, the match software performs the "weighting" program that performs a mathematical calculation on the tables (block 686) and create a match table (block 687) that shows which training interventions are matched to skilling objects with corresponding scores reflecting the probability of valid matches (Table 7). A score for each skilling object is calculated that, in an exemplary embodiment, is the sum of three scores. The higher the score, the higher the probability that a selected course supports the skill desired.

Score 1. An exemplary algorithm for calculating Score 1 is as follows, with the calculation performed for each word from word #1 to word #n in the skill and every course (i.e., training intervention). This score looks at each word in the skilling object and compares it to the words in each training intervention. If words are duplicated in the skilling object's words, the calculation is only performed once for each word. The software adjusts for singular and/or plurals. For example, a singular form of a word found in the training intervention and a plural form found in the skilling object are treated as equal. A default word weight value of "1" is given for each word unless modified by the word weight table.

Score 1=[(count of word #1 in course operating elements)(weight of word #1)]+[(count of word #2 in course operating elements)(weight of word #2)]+. . . +[(count of word #n in course operating elements)(weight of word #n)]

Score 2. For each combination of two, three, or four words in the skilling object's words that match two, three, or four word combinations in the training intervention's words, bonus points (normally 500 for each match) are added to Score 2. The maximum score for Score 2 is set to 9000 (500×18 occurrences). The value of the bonus points for the two-, three-, or four-word phrase matches is adjustable by the administrator, but the maximum score for Score 2 cannot exceed 9000.

Score 3. Score 3 is obtained by comparing the words in the skilling object's and training intervention's "discipline" elements. An exact match places 10,000 points into Score 3. Score 3 may or may not be used, at the discretion of the administrator during the setup procedure. If the administrator knows that a common "discipline" element exists for some or all skilling objects and training interventions, he/she would select the elements that will be compared for establishing Score 3. If the element is selected for establishing Score 3, the element cannot be used in the Score 1 or Score 2 calculations.

In this method, Score 1 alone shows the relationship of words, without a high probability of the same contextual meaning between the skilling object and training intervention. A Score 1 value above 30 is typically a good indicator that a valid relationship exists.

A Score 2 value between 500 and 9000 indicates an increased probability of a valid relationship because of the combination of words or "like phrases." The higher the score for Score 2, the higher the probability of a valid relationship.

By adding Score 3 to Score 1 and Score 2, the probability of a valid relationship increases dramatically, because it tells us that the skilling object and the training intervention involve the same subject matter (e.g., mathematics, chemistry, information technology, leadership, etc.). For example, a total score of 19,053 would indicate a valid relationship of the skilling object and the training intervention. In this example, both the skilling object and the training intervention could have indicated that the discipline is "IT Tools" (Score 3=10,000). There are at least 18 occurrences of matched two-word phrases such as "Microsoft Access" (Score 2=500×18=9000), and 53 occurrences of a word in the training intervention elements that match a word in the skilling object (Score 1=53).

Table 7 is an example of a Match Table showing a total score consisting of Score 1+Score 2 and all word weights equal to "3." This table is the result of running the matching software of the present invention on the operating elements of Table 1; the training intervention used is shown in Table 2; the skilling objects in Table 3; the results of the word skip table on the words table in Table 4; with the "3"s indicating that the words were not used in the calculation; and Table 5 showing the phrases.

TABLE 7

| ID | ObjID | CourseID | Score |
|----|---------|----------|-------|
| 41 | KNOW1012 | 12663 | 533.0 |
| 42 | KNOW581 | 12663 | 124.0 |

Returning to FIG. 4, the "score" 505 as calculated by the matching algorithm 503 for the results of the mapping of the skill ID 501 to the course description 502 is tabulated. A threshold level 506, which is selectable by the administrator, provides a cutoff below which a course 502 is not considered. The administrator can also select matches "manually" and create desired links in the neighborhood of the threshold 506. With automatic linkage 507 the system 10 proceeds directly to updating the appropriate course metadata element(s) 508 in the metadata database 207; with semiautomatic linkage 511 the administrator intervenes by setting a desired competency level 509 prior to updating the metadata element(s) 508. The automatic linkage 507 establishes the association of the skill to the course. The semiautomatic link 511 establishes the competency level acquired from the course, as well as the association.

Specifically, the administrator creates links along the automatic pathway 507 or the semiautomatic pathway 511 by a combination of:

1. Selecting all matches for a range of scores (i.e., setting the lower and higher scores results in all matches equal to or greater than the lower score but less than or equal to the higher score to be linked) or above a selectable threshold level;

2. Selecting one match at a time (i.e., link the one match selected); or

3. Selecting multiple matches (i.e., highlighting various matches and then linking them all simultaneously).

Figure 6:
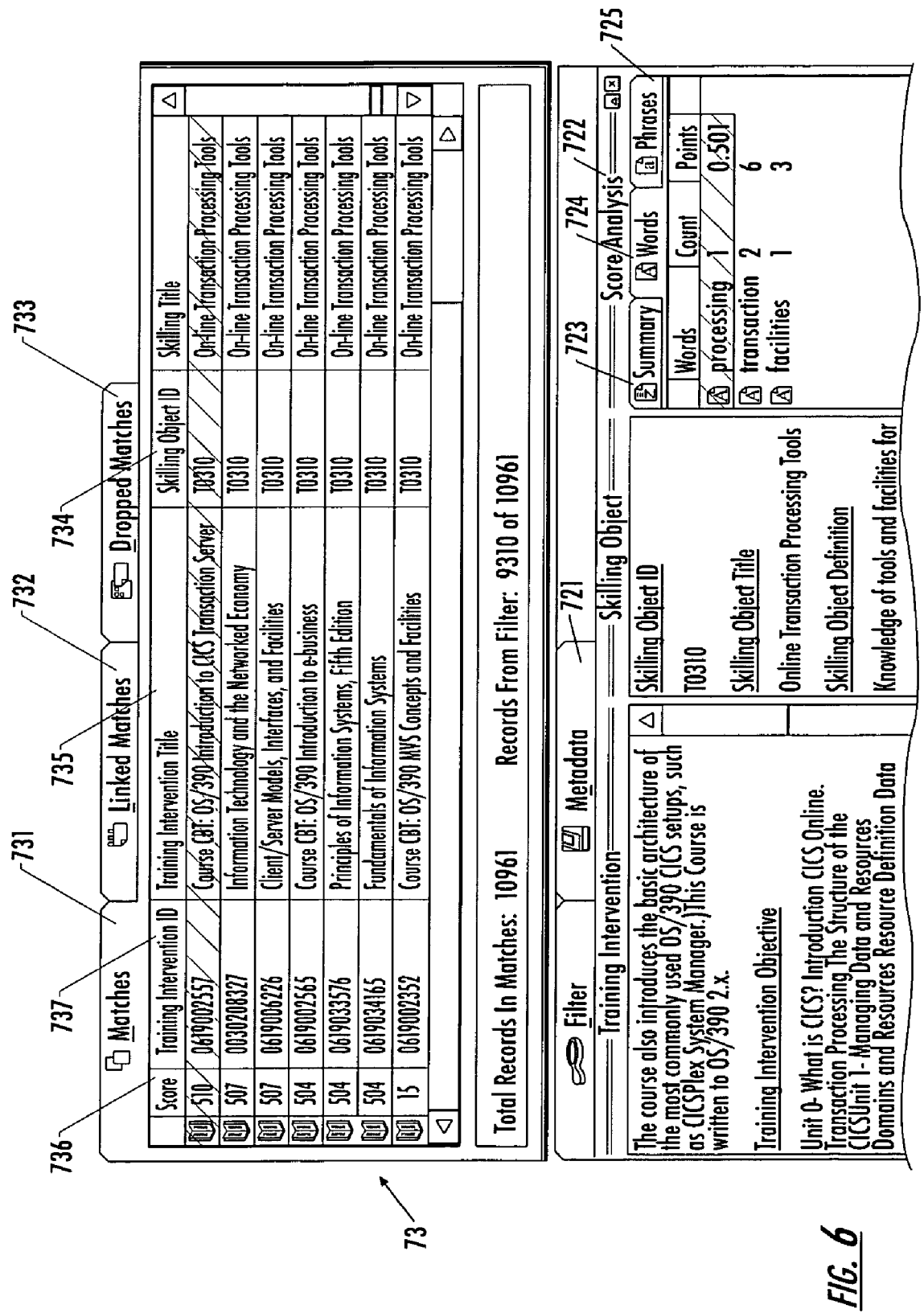
FIG. 6 is an exemplary screen for viewing matches.

The linking software of the present invention permits the administrator to view matches in a "Matches View Tab," which is illustrated in the screen 73 of FIG. 6. The administrator may view matches in the tabbed subsets ("Matches," 731 "Linked Matches," 732, and "Dropped Matches" 733) in a plurality of ways, including: by skilling object type; by skilling object identifier or group 734; by training intervention ID 737 (e.g., "061" displays all matches of training interventions with IDs of "061xx"); by match scores 736 above or below a score; by exact match score or group (e.g., "5" displays all scores between 500.0 and 599.9); all matches by skilling object or training intervention 735. The linking software further permits sorting the information in any column, in ascending or descending order.

Figure 7:
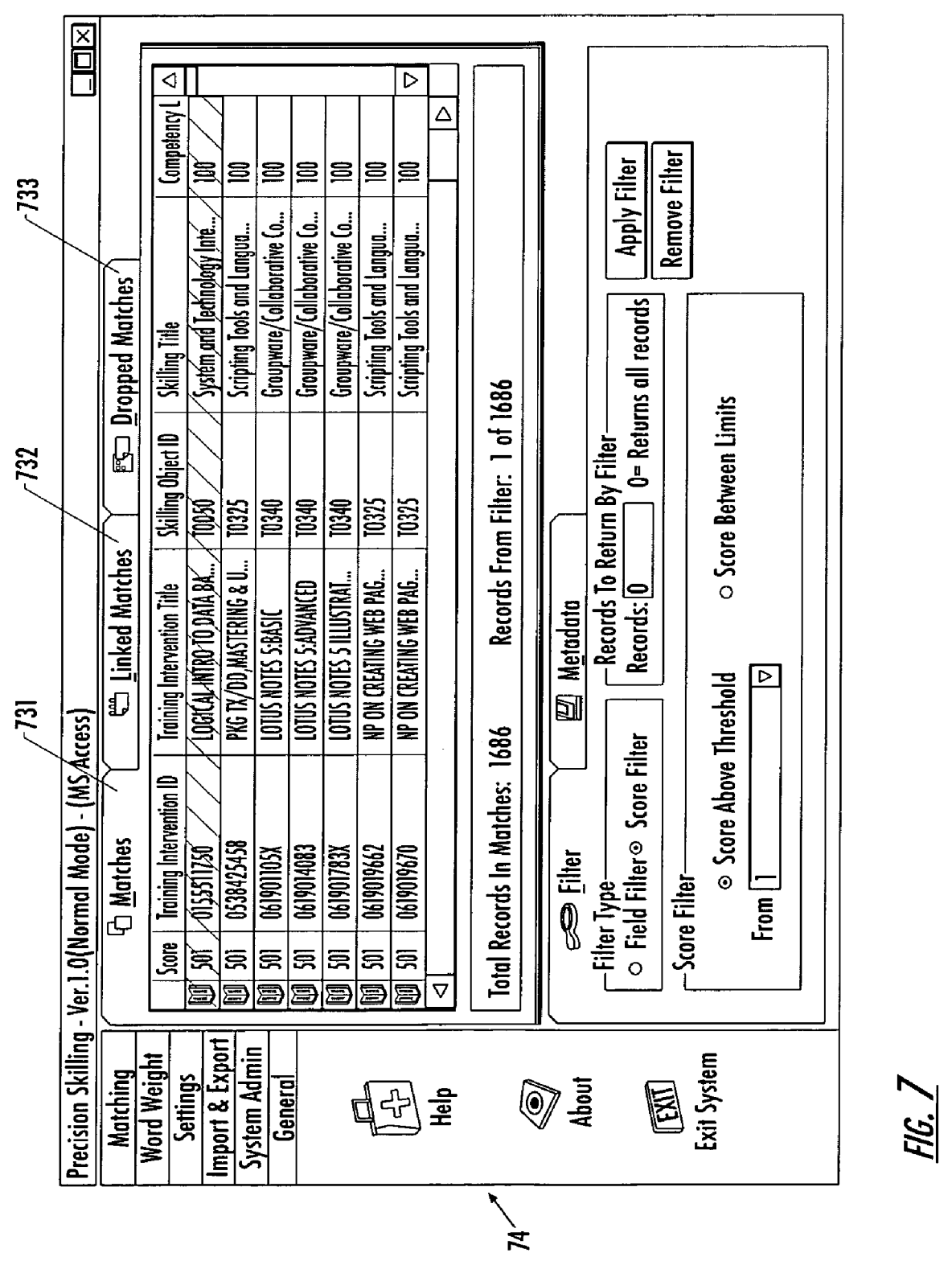

Under the Matches tab 731, the matched pairs are received from the match table whose status is "matched," while the Linked Matches and Dropped Matches views receive their matched pairs from the match table with status of "linked" and "dropped," respectively (see FIG. 7, illustrating the Matches tab screen 74).

The administrator views the matched pairs in the Matches tab 731 screen 74 to determine if the pairs are valid or invalid associations. For each matched pair, the administrator either links it (changes status to "link," which can be viewed in the Linked Matches tab 732) or drops it (changes status to "dropped," which can be viewed in the Dropped Matches tab 733). The match scores serve as the primary indicator of whether the matched pair in the Matches tab 731 is a valid association (to be linked) or invalid (to be dropped).

The present invention provides additional information to the administrator as assistance in making the determination to link or drop a matched pair. A Metadata tab 721 (FIG. 6) brings up the subscreen shown on screen 73, and permits the administrator to select a matched pair to view the metadata for both the skill and the training intervention. A "score analysis" 722 is also available, which provides a summary of the matched pair score 723, the words that created the match 724, along with the frequency count and weight, and any two-, three-, or four-word phrases 725 that occurred.

When the administrator makes a link, by selecting a "Link" selection button on the screen, the match is removed from the match table so that the administrator can continue the linking process on remaining matches if desired. If the administrator subsequently removes a link, the match information is restored into the match table.

When the linking process is complete (i.e., all matched pairs in the match table have been either linked or dropped), the competency level for the training interventions can be set for any skilling objects they support 509, as stated above. At any time the administrator may select a matched pair to view the metadata elements, which is displayed in the Metadata view tab. The metadata may provide sufficient information for the administrator to set the competency level, or the administrator may have to confer with an outside subject matter expert on the training intervention to set the competency level.

Returning to FIG. 3B, in a fourth table 44 a training plan is formulated, containing a column 441 of required skills and a column 442 of respective courses to be taken by the user. Thus it may be seen that the system precisely maps the training to the desired tasks, tools, and knowledge required by the organization. The table 44 is created dynamically, based on the user's gap information received by the gap analysis software and the links that were established during the linking process.

Another aspect of the present invention comprises a system and method for creating/updating the skilling object metadata database 204 and training metadata database 207, including creating skilling object linkages within the training metadata database 207, which is an integral feature to providing an automated or semiautomated linking framework for creating individualized training regimens (FIG. 4). Creating/updating the training metadata database 207 is accomplished by importing training intervention metadata from any desired source into an input means of the system 10 as is known in the art, or, in some cases, providing a linkage to an external source, such as via an intranet or internet.

In an automated linking framework the results of a matching algorithm are fed to a system 508 for updating the metadata database 207. In a semiautomated matching framework the results of the matching algorithm are passed to an intermediate step 509, wherein competency level(s) may be set prior to updating the metadata database 207. Also, setting a competency level may be accomplished anytime after links have been established through automatic linkage 507.

More specifically, the software adapted to perform updates when a user adds, deletes, or changes a training intervention or a skilling object. This software reconciles the differences and focuses on the impact of the new, deleted, or changed training intervention or skilling object on linkages and/or competency levels.

If the administrator initiates a transfer of revised information from an external source (e.g., a learning management system, human resource system, skills management system, CD-ROM, etc.), the update software compares the new information with previously archived information to determine if changes exist and allows the administrator to make necessary updates to the linkages. This process (FIG. 5) comprises the following steps in an exemplary embodiment:

1. The administrator initiates an input of a new training intervention and skilling object element through the input/output interface (block 620). If there is an existing archive (block 621), the software informs the administrator as to whether there are any new, deleted, or changed skilling objects or training interventions and prompts the administrator to run the Update program (block 622). The Update program updates all matching and linking information in the database (block 623) for only those matched pairs affected by the changes in either the skilling objects or training interventions.

2. During the process of importing the new database, the software compares the new information in the current database with the archive (block 624). If there are no differences, the software notifies the administrator (block 625) and then branches to the "main" screen (block 626). If there are differences, the software records the identifiers (IDs) of the objects (either new or modified objects) (block 627) and creates a "change table" that lists the IDs of the subject objects (block 628).

3. The software then performs a word harvest on the current database for the IDs contained in the change table (block 629) and a word harvest on the archive for any IDs in the change table that exist in the archive (block 630).

4. The software then compares the two word harvests and creates a "change word table" that reflects the differences in word counts, word positions, and phrases (block 631).

5. After allowing the administrator the opportunity to view the change word table and to make any desired adjustments to the word skip or word weight tables, the software then modifies the words table based on the differences in the change word table (block 632).

6. The software then runs the matching utility, and places the results in the match table (block 633).

7. The software then allows the administrator to view a screen that shows the changes by training intervention (Table 8) or skilling object (Table 9; block 634). The example shown in Tables 8 and 9 assumes that the information in training intervention "T1" and skilling object "C" has been modified and that there are two new skilling objects, "F" and "G."

TABLE 8

Training Intervention View

| Training Intervention ID | Training Intervention Title | Skilling Object ID | Skilling Object Title | Archive Match Score | New Match Score | Link Y/N/? | Competency Level |
|---|---|---|---|---|---|---|---|
| T1 | Title 1 | A | Title ABC | T1AA1 | T1AA2 | Y | 51.5 |
|  |  | B | Title DEF | T1BB1 | T1BB2 | Y | 30.0 |

TABLE 8-continued

Training Intervention View

| Training Intervention ID | Training Intervention Title | Skilling Object ID | Skilling Object Title | Archive Match Score | New Match Score | Link Y/N/? | Competency Level |
|---|---|---|---|---|---|---|---|
| | | C | Title GHI | T1CC1 | T1CC2 | N | — |
| | | F | Title PQR | | | ? | — |
| T2 | Title 2 | C | Title GHI | T2CC1 | T2CC2 | Y | 35.0 |
| | | D | Title JKL | T2DD1 | T2DD2 | Y | 70.0 |
| | | E | Title MNO | T2EE1 | T2EE2 | Y | 50.5 |
| | | F | Title PQR | — | T2FF2 | ? | — |
| T9 | Title 3 | F | Title PQR | — | T9FF2 | ? | — |
| | | G | Title STU | — | T9GG2 | ? | — |

TABLE 9

Skilling Object View

| Skilling Object ID | Skilling Object Title | Training Intervention ID | Training Intervention Title | Archive Match Score | New Match Score | Link Y/N/? | Competency Level |
|---|---|---|---|---|---|---|---|
| C | Title GHI | T1 | Title 1 | T1CC1 | T1CC2 | N | — |
| | | T2 | Title 2 | T2CC1 | T2CC2 | Y | 35.0 |
| F | Title PQR | T1 | Title 1 | — | T1FF2 | ? | — |
| | | T2 | Title 2 | — | T2FF2 | ? | — |
| | | T9 | Title 9 | — | T9FF2 | ? | — |
| G | Title STU | T9 | Title 9 | — | T9GG2 | ? | — |

8. Both views display every object affected by the changes, the titles of the object and training intervention, the archive match score, the new match score, any links that were previously made, and the corresponding competency levels. Additional features of these views include:

a. All matches affected by the new, deleted, or changed object metadata are viewed separately from unaffected matched pairs by selecting "Update Mode." Here, the administrator can focus on only those relationships affected by the changes (block 635).

b. Double clicking on an object (training intervention or skilling object) displays the skilling object and training intervention metadata in the Metadata view tab (block 636). This allows the administrator to make judgments on the impact of the new/changed information on links. Obviously, new objects would not have a previous match score.

c. The provision to link (by individual selections, above a threshold or between scores) and to set the competency levels provided (block 637).

d. The link for each new or modified object is initially shown as a question mark (?), and its corresponding competency level is shown as a dash (-) (block 638). This facilitates the administrator's being able to see which links and competency levels have to be made.

e. All links and competency levels for the changed objects should be made before exiting the update software (block 639). If the administrator exits the update software without making a link determination for every new object (i.e., moving all matched pairs from the Matches View to either the Linked Matches or Dropped Matches Views), the software retains all work performed for the next time the administrator enters the program (block 640). To view where he/she left off, the administrator brings all unresolved matched pairs into the Matches View for subsequent linking or dropping.

9. After the administrator reconciles all matched pairs in the Update mode, he/she must inform the software by selecting an "Accept All Updates" choice, which integrates all the matched pairs under Update, with the matched pairs unaffected by the new, deleted, or changed objects. This process allows the software to maintain a baseline of all linkage information to the last import of skilling object and training intervention metadata.

FIG. 1C represents the functional interplay between system elements for two anticipated accessors of the system 10: an administrator and a user/employee. The administrator's tasks include: (1) load/manage training metadata database; (2) load/manage skilling object metadata database; (3) maintain system configurations; (4) view training intervention metadata elements; (5) view skilling object metadata elements; (6) run software utilities; (7) link training interventions to skilling objects and set corresponding competency levels; and (8) export linkage reports. The manager's tasks include: (1) view available courses; (2) view available skills; (3) search courses; (4) create/manage collections of courses based on existing objects; (5) match skills to courses; and (6) report progress. The user's tasks include: (1) select skills needed based on the gap analysis; (2) generate an individual development plan; and (3) send a curriculum to a course management system. The division of tasks within the system 10 are summarized in Table 10.

TABLE 10

| | Precision Skilling Functions | |
|---|---|---|
| | Input/Output | |
| Function | The Administrator | |
| 1. Input Initial Skilling Object and Training Intervention Metadata Elements | Controls the transfer of the training intervention and skilling object metadata elements from the LMS to the PS database at the onset. | |
| 2. Input Updated Skilling Object and Training Intervention Metadata Elements | (See Update Software) | |
| 3. Output database tables to LMS | Controls the transfer of PS database tables to the LMS and/or removable media. | |
| 4. Provide reports | Creates the following reports: 1. Linked Skilling Objects - A listing of all linked skilling objects and the corresponding training interventions with competency levels. 2. Linked Training Interventions - A listing of all linked training interventions with competency levels and the corresponding skilling objects. 3. Unlinked Skilling Objects - A listing of all unlinked skilling objects. 4. Unlinked Training Interventions - A listing of all unlinked training interventions. | |
| Function | The Employee | |
| Accept Skilling Object Gap Information. | Via the LMS Gap Generator, initiates the sending of the gap information to PS. | |
| | Matching Software | |
| Function | The Administrator | |
| 1. Setup Utility | Selects which skilling object and training intervention metadata elements will be used in the Harvest and Match programs. | |
| 2. Harvest Utility | Executes the Harvest Utility software that searches through all of the words in the training intervention and skilling object metadata operating elements to establish: 1. The Words Table which contains: a) a listing of words found, and b) the number of times each word was found. 2. The juncWords_Courses Table that records the position of each word in the training intervention operating elements. 3. The juncWords_Skills Table that records the position of each word in the skilling object operating elements. | |
| 3. Weight Utility | 1. May modify the Word Skip Table prior to initiating the execution of the Weight Utility software. 2. Executes the Weight Utility software that: a) Compares the Word Table to the Word Skip Table. Words in the Words table that are found in the Word Skip Table are set to "1", indicating they will be skipped (i.e., ignored) during the Match Utility. b) Creates a Phrases Table that contains two and three word phrases or groupings. These phrases will be used during in the Matching Utility to give "bonus" points for phrase matches found in the training intervention and the skilling object. 3. Insert words and corresponding weights into the Word Weight Table to enhance the probability of valid matches due to known words in the training intervention metadata elements that are used by many training interventions. The word weights would normally be set to a value less than "1" (the default weight for each word). | |
| 4. Match | Executes the Match Software that computes a score of probable valid match for each skilling object to training intervention (i.e., the training intervention supports the skilling object). The resulting Match Table provides a listing of probable valid matches with corresponding scores. The total match score is the sum of three individual scores (see Match Utility paragraph for details). | |

TABLE 10-continued

Precision Skilling Functions

Linking Software

| Function | The Administrator |
|---|---|
| 1. Link Training Intervention(s) to Skilling Object(s) | Examines the contents of the Match Table via a Linking Screen to select which matches are valid matches and executes the Link Software that records the link to the skilling framework discipline in the training intervention metadata element (Classification. Purpose (Discipline). TaxonPath). The administrator makes links by combination of: <br> 1. selecting all matches between two match values, <br> 2. selecting one match at a time (i.e., link the one match selected), or <br> 3. selecting multiple matches (i.e., highlighting various matches and then linking them all at the same time). <br> Once a link is made, the match information for that link is removed from the Linking Screen. |
| 2. Setting Competency Levels | 1. Selects a screen where he/she can select: <br>   a) A single training intervention <br>   b) Grouping of training interventions (e.g., all 123xx courses) <br>   c) All training interventions <br> 4. Then calls up the training intervention metadata for examination. <br> 5. Enters the competency level for the link to each skilling object (i.e., at what competency level does this training intervention support each of the linked skilling objects). |
| 3. Change Competency Levels | 1. Selects a screen where he/she can select: <br>   a) A single training intervention <br>   b) Grouping of training interventions (e.g., all 123xx courses) <br>   c) All training interventions <br> 4. Then calls up the training intervention metadata for examination. <br> 5. Changes the competency level for any link to a skilling object (i.e., at what competency level does this training intervention support each of the linked skilling objects). |
| 4. Delete a Link | 1. Selects a screen where he/she can select: <br>   a) A single training intervention <br>   b) Grouping of training interventions (e.g., all 123xx courses) <br>   c) All training interventions <br> 2. Then calls up the training intervention metadata for examination. <br> 3. Deletes any link to a skilling object. <br> Note: Any link that is deleted results in having the original match information placed back into the Linking Screen. |

Update Software

| Function | The Administrator |
|---|---|
| 1. Input Updated Skilling Object and Training Intervention Metadata Elements | 1. Initiates the input of the new training intervention and skilling object elements through the Input/Output Interface. <br> 2. If there is an existing archive (i.e., Precision Skilling has previously operated on the elements), the Update Software queries the administrator as to whether he/she wants to "Compare" for differences or to "Replace". "Replace" removes all matching and linking information in the current database. NOTE: Replacement is not normally done in an operational environment. <br> 3. If the administrator selects "Replace", the software branches to the 'Main Menu' screen. <br> 4. If the administrator selects 'Compare', the software compares the new information in the current database with the archive. <br>   a) If there are no differences, the software notifies the administrator and then branches to the 'Main Menu' screen <br>   b) If there are differences, the software records the identifiers (ID's) of the objects (either new or modified objects) and creates a "Change Table" that lists the ID's of the subject objects. <br>     1) The software then performs a word harvest on the current database for the ID's contained in the |

TABLE 10-continued

| Precision Skilling Functions | |
|---|---|
| | Change Table and a word harvest on the archive for any ID's in the Change Table that exist in the archive.<br>2) The software then compares the two harvests and creates a "Change Word Table" that reflects the differences in word counts.<br>3) The software pauses to allow the administrator the opportunity to view the Change Word Table and to make any adjustments to the Word Skip or Word Weight tables |
| 2. Adjust Word Skip and Word Weight Tables | The administrator views the Change Word Table and to make any adjustments to the Word Skip or Word Weight tables. |
| 3. Access impact of changes on link information | 1. When finished with any changes he/she might make, the administrator resumes the Update software.<br>a) The software then modifies the "Words Table" based on the differences in the Change Word Table.<br>b) The software then runs the Match Utility on the changed training intervention and skilling object metadata databases, placing the results in the Match Table.<br>c) The software then allows the administrator to view a screen that shows the changes by training interventions or skilling objects. Both views display every object affected by the changes, the titles of the skilling object and training intervention, the archive match score, the new match score, any links that were previously made, and the corresponding competency levels. Modified and new objects are highlighted to make it easy for the administrator to identify them from unchanged objects.<br>2. The administrator then selects (e.g., double clicking on the object) an object (training intervention or skilling object) to have the software display a window that shows the archive information and the new information. This allows the administrator to make judgements on the impact of the new information on links. Obviously, new objects would not have previous information. |
| 4. Update Link Information | If the administrator determines changes are needed to the link information or there are new objects (training interventions or skilling objects), he/she inserts the appropriate information.<br>1. The software provides the capability for the administrator to link (by individual selections, between scores, or above a threshold score) and to set the competency levels.<br>2. The software initially shows the link for each new or modified object as a question mark (?) and its corresponding competency level as a dash (-). This makes it easy for the administrator to see which links and competency levels he/she has to make.<br>Note 1: All links and competency levels for the changed objects should be made before the administrator exits the Update Software. If the administrator exits the Update Software without making a link and competency determination for every new object (i.e., changing the Link column to either N or Y and setting the competency level for every Y), the software prompts the administrator indicating that all links and competency levels for the changed objects were not made and that the working data will be saved to be worked on at a later time.<br>Note 2: If the administrator exits the Update Software without completing the links and competency levels, the software provides a prompt to the administrator each time he/she enters Precision Skilling. |

| Gap Analysis Software | |
|---|---|
| Function | The Software |
| 1. Accept Gap Information | Receives information for one skilling object gap |
| 2. Convert Gap Levels to Percentages | The software converts the levels to percentages only if the gap levels are not in percentages.<br>Note: The administrator establishes whether to convert or not convert based on the client's rating scales. It may be possible for a client who is supporting several skill frameworks to have some gaps generated as percentage and others as simple rating scales (with decimals). |

TABLE 10-continued

Precision Skilling Functions

| | |
|---|---|
| 3. Compile the List of Training Interventions | 1. The software examines the Skilling Object ID to compile a list of linked training interventions with competency levels that fall within the range of the "desired" level and the "actual" level.<br>2. For every training intervention identified in the list, the software looks at the Training Intervention "Prerequisite" element and adds the prerequisites to the list. |
| 4. Send the Training Interventions to the LMS | The software sends an ordered list of training interventions to the LMS. Each training intervention in the list includes:<br>1. The Training Intervention ID<br>2. The Competency Level of the training intervention for the skilling object expressed in the form received by the LMS (i.e., single digit, with or without fraction, or percentage).<br>3. Followed by the Prerequisite IDs |

The administrator's interactions include a login 701 to the processor 12, which typically includes an entry of a password. The administrator is permitted by the system to access the user management subsystem 702 and a user database 703 thereby.

The administrator is responsible for automatically loading the desired skilling object metadata elements into the skilling object metadata database 200, via a routine 704 adapted therefore. The administrator is also responsible for automatically loading training intervention metadata elements into the training intervention metadata database 207 via a routine 706 adapted therefore. Help files 707 are also provided for guiding the administrator through the system. For courses that do not contain assessment features therewith, the administrator can use an assessment architect 708 to create them.

The administrator uses the matching routine 503 to match training interventions in the training intervention metadata database 207 to skilling objects in the skilling object metadata database 200. The matching routine 503 creates a Match Table 504 that contains scores for each match; the higher the score, the higher the probability of a valid association. Help files 709 are also provided here. The linking software 711 establishes a link and competency table (actually a subset of the training intervention metadata database) that reflects the valid association of skilling objects to training interventions. These associations and corresponding competency levels are used during the gap analysis process 202-207.

The user/employee accesses the system 10 and initiates the gap analysis process 202-207, as described earlier. The gap analysis software establishes an individual development plan 208 for the incoming skill gap. The system 10 exports the individual development plan 208 to an external learning management system 710, which the user accesses to take or register for the prescribed training interventions (courses).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computer-readable medium encoded with computer software for automatically producing an individualized learning sequence in a subject area for addressing a skill gap between a skill level of a user and a skill level desired to be possessed, the software comprising code segments for:

receiving a skill level currently possessed by a user in at least one skill in a predetermined subject area;

entering a natural language description of the at least one skill in the predetermined subject area;

making a comparison of the possessed skill level with a skill level desired to be possessed by the user in the at least one skill;

determining from the comparison a skill gap between the possessed skill level and the desired skill level;

mapping the skill gap with at least one course having an entry in an electronic database to fill the skill gap, wherein the entry for each course in the database comprises a skill level achievable with the use of the course, a prerequisite skill level, and a natural language description of the course, by:

locating a first course in the database having a prerequisite skill level less than or equal to the possessed skill level;

if a first course achievable skill level is less than the desired skill level, locating a second course in the database having a prerequisite skill level less than or equal to the first course achievable skill level and further having an achievable skill level greater than the first course achievable skill level;

tabulating each word in the natural language description of each mapped course;

tabulating a number of occurrences of each word in the natural language description of each mapped course;

making a comparison of each word in the natural language description of each mapped course with a list of words that should be skipped;

assigning a null weighting value to each word that should be skipped as determined by the each word comparison;

assigning a weighting value to each nonskipped word;

matching words in the natural language descriptions of each mapped course in the database and of the at least one skill in the predetermined subject area; and ranking each course having at least one matching word with the description of the at least one skill in the predetermined subject area for probable relevancy, by using each matching word and the weighting value of each matching word to determine a score for each mapped course indicative of the probable relevancy;

receiving an administrative selection between code segments for:

automatically creating a set of training interventions to be recommended to the user, the set containing the at least one mapped course; and displaying to an administrator the at least one mapped course comprising the first course, and, if located in the mapping code segment, the second course, for administrative review, and, if desired, receiving a manual selection of the at least one mapped course for including in a set of training interventions to be recommended to the user; and creating a training regimen comprising the set of training interventions.

2. The computer-readable medium recited in claim 1, wherein tabulating code segments further comprise code segments for:

tabulating each word phrase in the natural language description of the mapped course; and tabulating a number of occurrences of each word phrase in the natural language description of the mapped course; and wherein:

the word matching code segment comprises a code segment for matching word phrases in the natural language descriptions of the mapped course in the database and of the at least one skill in the predetermined subject area;

the weighting value assigning code segment further comprises a code segment assigning a weighting value to each word phrase; and the ranking code segment further comprises a code segment for using each matching word phrase and the weighting value of each matching word phrase to supplement the score indicative of the probable relevancy.

3. A computer-readable medium encoded with computer software for automatically producing an individualized learning sequence in a subject area for addressing a skill gap between a skill level of a user and a skill level desired to be possessed, the software comprising code segments for:

making a comparison of a possessed skill level in a predetermined subject area with a skill level desired to be possessed by a user to determine a skill gap, the skill having associated therewith a natural language description; and mapping the skill gap with at least one course having an entry in an electronic database to fill the skill gap, wherein the entry for each course in the database comprises a skill level achievable with the use of the course, a prerequisite skill level, and a natural language description of the course, by:

locating at least one course in the database having a prerequisite skill level less than or equal to the possessed skill level;

tabulating each word in the natural language description of each located course;

tabulating a number of occurrences of each word in the natural language description of each located course;

making a comparison of each word in the natural language description of each located course with a list of words that should be skipped;

assigning a null weighting value to each word that should be skipped as determined by the each word comparison;

assigning a weighting value to each nonskipped word;

matching words in the natural language descriptions of each located course in the database and of the at least one skill in the predetermined subject area;

ranking each course having at least one matching word with the description of the at least one skill in the predetermined subject area for probable relevancy, by using each matching word and the weighting value of each matching word to determine a score for each located course indicative of the probable relevancy; and presenting the score to the user.

4. The computer-readable medium recited in claim 3, wherein tabulating code segments further comprise code segments for:

tabulating each word phrase in the natural language description of the mapped course; and tabulating a number of occurrences of each word phrase in the natural language description of the mapped course; and wherein:

the word matching code segment comprises a code segment for matching word phrases in the natural language descriptions of the mapped course in the database and of the at least one skill in the predetermined subject area;

the weighting value assigning code segment further comprises a code segment assigning a weighting value to each word phrase; and the ranking code segment further comprises a code segment for using each matching word phrase and the weighting value of each matching word phrase to supplement the score indicative of the probable relevancy.

* * * * *